US012632023B2

(12) United States Patent   (10) Patent No.: US 12,632,023 B2
Braedt et al.   (45) Date of Patent: May 19, 2026

(54) MODULAR REACTION CONTROL SYSTEM FOR LIVE MONITORING OF LONG-TERM AND/OR MULTI-CHANNEL REACTIONS

(71) Applicant: University of Wyoming, Laramie, WY (US)

(72) Inventors: Daniel L. Braedt, Laramie, WY (US); Andrew S. Hudson, Laramie, WY (US); Marvin C. Perry, Laramie, WY (US); Jing Zhou, Laramie, WY (US)

(73) Assignee: University of Wyoming, Laramie, WY (US)

( * ) Notice: Subject to any disclaimer, the term of this patent is extended or adjusted under 35 U.S.C. 154(b) by 1101 days.

(21) Appl. No.: 17/674,700

(22) Filed: Feb. 17, 2022

(65) Prior Publication Data

US 2022/0269233 A1   Aug. 25, 2022

Related U.S. Application Data

(60) Provisional application No. 63/152,053, filed on Feb. 22, 2021.

(51) Int. Cl.
*G05B 19/042*   (2006.01)
(52) U.S. Cl.
CPC .. *G05B 19/042* (2013.01); *G05B 2219/32287* (2013.01)
(58) Field of Classification Search
CPC .... G05B 9/02; G05B 18/042; G05B 18/0426; G05B 2219/32287
See application file for complete search history.

(56) References Cited

U.S. PATENT DOCUMENTS 4,891,950 A   1/1990 Seufert et al.
7,776,932 B2   8/2010 Marion et al.
(Continued)

OTHER PUBLICATIONS

Pariyani, Ankur, et al. "Incidents investigation and dynamic analysis of large alarm databases in chemical plants: A fluidized-catalytic-cracking unit case study." Industrial & Engineering Chemistry Research 49.17 (2010): 8062-8079. (Year: 2010).*
(Continued)

*Primary Examiner* — Robert J Eom
(74) *Attorney, Agent, or Firm* — Leydig, Voit & Mayer, Ltd.

(57) ABSTRACT
A method of live monitoring of long-term and/or multi-channel reactions may include: controlling a chemical reaction apparatus via a modular control system, collecting reaction data via the digital and analog input ports, logging the reaction data via a data logging module configured to transmit the reaction data to a remote data server for data storage, periodically querying a remote interlock server for an emergency stop instruction via an emergency stop controller, inputting the emergency stop instruction into the remote interlock server via a remote user interface, executing, in response to receiving the emergency stop instruction, one or more emergency stop actions. The modular control system may include: a digital control module in electrical communication with digital input and output ports; an analog control module in electrical communication with analog input and output ports; and a pneumatic control module in pneumatic communication with pneumatic output ports.

15 Claims, 17 Drawing Sheets

(56) References Cited

U.S. PATENT DOCUMENTS

| | | | |
|---|---|---|---|
| 8,303,848 B2 | 11/2012 | Morita et al. | |
| 2010/0175320 A1 | 7/2010 | Schuetzle et al. | |
| 2011/0137471 A1* | 6/2011 | Dailey, Jr. | E21B 34/045 |
| | | | 700/282 |
| 2016/0130142 A1 | 5/2016 | Achilles et al. | |
| 2020/0021781 A1* | 1/2020 | Al-Salem | H04N 7/188 |

OTHER PUBLICATIONS

She, Jingke, and Jin Jiang. "Potential improvement of CANDU NPP safety margins by shortening the response time of shutdown systems using FPGA based implementation." Nuclear engineering and design 244 (2012): 43-51. (Year: 2012).*

Atwood, M.T.; Schulman, B. L. (1977) The TOSCOAL process—pyrolysis of western coals and lignites for char and oil production, Prepr.—Am. Chem. Soc., Div. Fuel Chem., 22, 233-252.

Choudhary et al. (Dec. 2000) "Methane activation on Ni and Ru model catalysts," J. Mol. Catal. A Chem., 163, 9-18. https://doi.org/10.1016/s1381-1169(00)00395-2.

Craxford (1939) "The Fischer-Tropsch synthesis of hydrocarbons, and some related reactions," Trans. Faraday Soc., 35, 946-0958.

Dedov et al. (2018) "Synthesis Gas Production by Partial Oxidation of Methane and Dry Reforming of Methane in the Presence of Novel Ni—Co/MFI Catalysts," Pet. Chem., 58 (3), 203-213. https://doi.org/10.1134/S0965544118030052.

Du et al. (Sep. 2020) "Morphology and chemical states of Ni supported on Ti-modified CeOx(111) interfaces," Surface Science, 699, 121624, 1-7. https://doi.org/10.1016/j.susc.2020.121624.

Foster et al. (Jul. 2018) "Catalysts for nitrogen reduction to ammonia," Nat. Catal., 1 490-500.

Franchi et al. (Jan. 2020) "Hydrogen production via steam reforming: A critical analysis of MR and RMM technologies," Membranes, 10, 10.

Gangadharan et al. (2012) "Evaluation of the Economic and Environmental Impact of Combining Dry Reforming with Steam Reforming of Methane," Chem. Eng. Res. Des., 90 (11), 1956-1968. https://doi.org/10.1016/j.cherd.2012.04.008.

Liu et al. (2016) "Dry reforming of methane on a highly-active Ni—CeO$_2$ catalyst: Effects of metal-support interactions on C—H bond breaking," Angew. Chem. Int. Ed., 55, 7455-7459. https://doi.org/ 10.1002/anie.201602489.

Luo et al. (2018) "Review of hydrogen production using chemical-looping technology," Renew. Sust. Energ. Rev., 81 (2018) 3186-3214. https://doi.org/10.1016/j.rser.2017.07.007.

Mullins (2015) "The surface chemistry of cerium oxide," Surf. Sci. Rep., 70, 42-85.

Pakhare et al. (2014) "A review of dry (CO$_2$) reforming of methane over noble metal catalysts," Chem. Soc. Rev., 43, 7813-7837. https://doi.org/10.1039/C3CS60395D.

Vosloo (2001) "Fischer-Tropsch: A futuristic view," Fuel Process. Technol., 71, 149-155.

Wang et al. (2010) "Thermodynamic analysis of propane dry and steam reforming for synthesis gas or hydrogen production," Int. J. Hydrog. Energy, 35, 12800-12807. https://doi.org/10.1016/j.ijhydene.2010.08.132.

Wittich et al. (Jan. 2020) "Catalytic dry reforming of methane: insights from model systems," Chemcatchem, 12, 2130-2147.

Wyoming venting and flaring regulations, 2019. https://www.energy.gov/sites/prod/files/2019/08/f66/Wyoming.pdf 2019 (accessed Oct. 9, 2020).

Zagaynov (May 2021) "Active components of catalysts of methane conversion to synthesis gas: Brief perspectives," Energy & Fuels, 35, 9124-9136.

Zhang et al. (2018) "In situ elucidation of the active state of Co—CeO$_x$ catalysts in the dry reforming of methane: The important role of the reducible oxide support and interactions with cobalt," ACS Catal., 8, 3550-3560.

Zhou et al. (2012) "Interactions of Ni nanoparticles with reducible CeO$_2$(111) thin films," J. Phys. Chem. C, 116, 9544-9549.

Zhou et al. (Jan. 2021) "Growth, sintering, and chemical states of Co supported on reducible CeO$_2$(111) thin films: The effects of the metal coverage and the nature of the support," J. Chem. Phys., 154, 044704.

* cited by examiner

MODULAR REACTION CONTROL SYSTEM FOR LIVE MONITORING OF LONG-TERM AND/OR MULTI-CHANNEL REACTIONS

CROSS-REFERENCE TO RELATED APPLICATIONS

This application claims the benefit of priority to U.S. Provisional Patent Application No. 63/152,053, filed Feb. 22, 2021, which is hereby incorporated by reference in its entirety.

BACKGROUND OF INVENTION

Long-duration chemical phenomena are of high importance in numerous research and industrial settings. For example, in the field of catalyst research and development, phenomena associated with long-term reactions such as thermal degradation, sintering, mechanical wear, and the slow build-up of contamination all occur on long time scales. Fast acting artificial aging techniques to simulate some of these otherwise long acting phenomena are known in the prior art. However, they all suffer limitations inherent with an imitation process. Thus, long duration chemical reactions must be performed to learn the true behavior of catalysts over time and advance the field. A major factor currently limiting the advancement and proliferation of long duration chemical reaction science, especially at small scale, is the need to have round-the-clock knowledgeable safety personnel on site to monitor the experiments and respond appropriately in the case of an emergency, such as a release or a runaway reaction. However, such round the clock coverage may be prohibitively expensive or otherwise impractical.

Thermal aging as known in the prior art may be effective for investigating thermal degradation and sintering behaviors of catalysts, but it cannot simulate mechanical wear, chemical poisoning, or slow buildup of contamination under steady temperature and flow rates. Running reactions in shifts requires coordination of researchers, training of multiple people, multiple safety contact points, and a large research group. Reactions with pure gasses limit risk exposure, but still present safety challenges, namely the risk of explosion, and exclude running reactions under practical conditions. Running reactions under practical conditions where toxic gasses are included requires either an off-site facility specially designed to handle toxic gasses, or the cessation of research after initial pure gas studies.

Thus, improved reaction control and safety systems are needed to advance the knowledge of long duration chemical phenomena.

SUMMARY OF THE INVENTION

Modular reaction control systems for live monitoring of long-term and/or multi-channel reactions are disclosed. In one embodiment, the system is an unattended reactor system capable of controlling, detecting, reacting to, and alerting of unsafe condition. In some embodiments, the systems are configured to automatically respond to a raft of safety events without human intervention and furthermore to notify a remote user in the occurrence of a safety event, and allow the remote user to control the chemical reaction equipment from the remote location. In some embodiments, the automatic response of the system may be triggered by the detection of toxic gasses such as $H_2S$, HCN, and carbon monoxide included or released via chemical reactions.

The safety of running overnight experiments and experiments with toxic gasses is greatly increased via the systems of automation and alarming disclosed herein. In some embodiments, the system is configured such that multiple alarms can be programed, with controls enabled by connecting each physical component to logic control. Full integration of all components with a single controlling unit may increase safety by allowing for a full system halt under dangerous conditions. Safety responses are programed in a field-programmable gate array (FPGA), allowing much faster system response times compared to human intervention. In systems of the prior art, even with fully attentive operators, pressure changes may not be detected immediately, causing harm to downflow components. If toxic gas alarms are employed in these prior art systems, the lab personnel may be alerted to evacuate, but may either take on further risk by staying to shut off each component such as the flow controllers, gas bottles, instrumentation, and furnace, or evacuate the lab and wait for a trained professional in proper personal protective equipment to enter the lab and resolve the situation. In some situations with explosive gasses, failure to immediately shut down a furnace or flame source (such as a flame-ionization detector) may exacerbate the issue.

Thus, the systems disclosed herein provide real-time responses to safety triggers, decreasing response times to potentially hazardous situations. Additionally, in some embodiments, data collection features of the system can be automated, replacing the need for a researcher to initiate a sampling event with a programmed sampling interval. In some embodiments, the system may be configured to automatically respond to the presence of toxic and/or explosive gases. For each toxic or explosive gas, sensors may be installed to provide feedback that allows programmatic responses to the different alarm levels. These gas sensors may be modular in that they can be exchanged to match relevant gasses for any application.

A non-safety benefit of automation is the reduced manual labor load required to monitor or control instrumentation.

In one embodiment, a modular reaction control system for live monitoring of long-term and/or multi-channel reactions comprises: a digital control module, an analog control module, a pneumatic control module, a touchscreen panel, a data logging module, and an automatic safety response module. The digital control module may be in electrical communication with digital input and output ports; the analog control module may be in electrical communication with analog input and output ports. The pneumatic control module may be in pneumatic communication with pneumatic output ports. The touchscreen panel may be adapted to display a process flow diagram, wherein the process flow diagram displays real time data and process conditions. The data logging module may be configured to receive data from the digital and analog control modules and transmit the data to a remote data server for data storage. The automatic safety response module may comprise: an FPGA, a remote alarm module, and an emergency stop interlock module and/or an additional manual emergency stop button. The FPGA may be configured to automatically respond to a set of predetermined safety events. The remote alarm module may be configured to provide notification of an alarm event to a remote user. The emergency stop interlock module may comprise: a remote user interface, a remote interlock server, and an emergency stop controller. The remote user interface may be configured to receive an emergency stop instruction from the remote user. The remote interlock server may be configured to store the emergency stop instruction. The emergency stop controller may be configured to periodically query the remote interlock server for the emergency stop instruction and, in response to receiving the emergency stop instruction, execute one or more emergency stop actions.

In one embodiment, the one or more emergency stop actions comprise actuating a valve and/or de-energizing a heating element. In some embodiments, the one or more emergency stop actions comprise energizing an exhaust fan. In one embodiment, the remote data server is a cloud-based server. In one embodiment, the remote interlock server is a cloud-based server.

In one embodiment, the system includes an uninterruptable power supply. In one embodiment, the FPGA is configured to automatically respond to one or more of the following predetermined safety events: sensing of a toxic gas, a high pressure alert, and/or a high temperature alert. In one embodiment, the user-configurable process flow diagram and the digital and analog modules are configured to control mass flow, temperature, pressure, and/or pneumatic valve state.

In one embodiment, the data logging module is configured to log data correlated to one or more of the following: gas sensor alarms, flow rates, gas chromatography (GC) output, pressure, temperature, and/or valve state.

In one embodiment, the remote alarm module is configured to provide SMS alarm alerts to a mobile device of the remote user. In one embodiment, the remote alarm module is configured to provide email alerts to a remote device of the remote user.

In one embodiment, a method for live monitoring of long-term and/or multi-channel reactions comprises: controlling a chemical reaction apparatus via a modular control system, collecting reaction data via the digital and analog input ports, logging the reaction data via a data logging module configured to transmit the reaction data to a remote data server for data storage, periodically querying a remote interlock server for an emergency stop instruction via an emergency stop controller, inputting the emergency stop instruction into the remote interlock server via a remote user interface, executing, in response to receiving the emergency stop instruction, one or more emergency stop actions. The modular control system may comprise: a digital control module in electrical communication with digital input and output ports; an analog control module in electrical communication with analog input and output ports; and a pneumatic control module in pneumatic communication with pneumatic output ports.

In one embodiment, the one or more emergency stop actions comprise actuating a valve, de-energizing a heating element, or energizing an exhaust fan. In one embodiment, the remote data server is a cloud-based server. In one embodiment, the remote interlock server is a cloud-based server. In one embodiment, the method includes maintaining power to the modular control system via an uninterruptable power supply.

In one embodiment, the method includes automatically responding to one or more predetermined safety events via an FPGA. In one embodiment, the one or more predetermined safety events comprise at least one of the following: sensing of a toxic gas, sensing a high pressure alert, and/or sensing a high temperature alert.

In one embodiment, the method includes inputting process parameters via a touchscreen panel adapted to display a process flow diagram, wherein the process flow diagram displays real time data and process conditions. In one embodiment, the data logging module is configured to log data correlated to one or more of the following: gas sensor alarms, flow rates, GC output, pressure, temperature, and/or valve state.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 14A shows data from 20 ml min$^{-1}$ nitrogen and 30 ml min$^{-1}$ reaction gas mixture. FIG. 14B shows data from 30 ml min$^{-1}$ nitrogen and 20 ml min$^{-1}$ reaction gas mixture. Both reactions had a nominal flow rate of 50 ml min$^{-1}$.

STATEMENTS REGARDING CHEMICAL COMPOUNDS AND NOMENCLATURE

Figure 1:
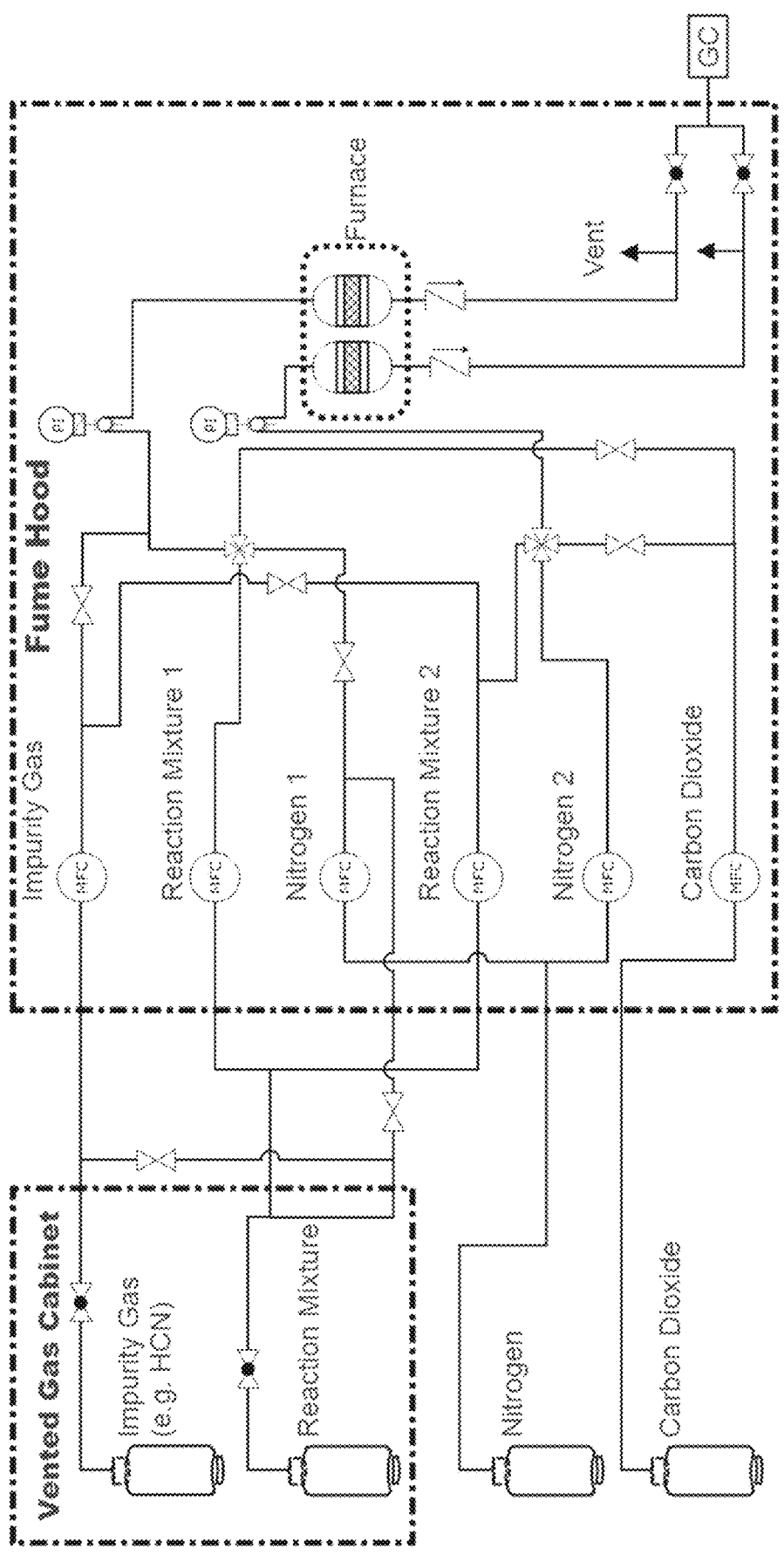
FIG. 1 is a schematic view of one embodiment of the reaction system showing reactant gas flow paths in three main zones: vented gas cabinet, fume hood, and outside of fume hood. Pressure indicators are marked with PI, mass flow controllers are marked as MFC, and check valves are situated below the reactors in the furnace.

In general, the terms and phrases used herein have their art-recognized meaning, which can be found by reference to standard texts, journal references and contexts known to those skilled in the art. The following definitions are provided to clarify their specific use in the context of the invention.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components, and methods of the present invention are set forth in order to provide a thorough explanation of the precise nature of the invention. It will be apparent, however, to those of skill in the art that the invention can be practiced without these specific details.

In some embodiments, the disclosed control systems can easily be adapted to a wide variety of reaction systems and conditions regardless of scale. This is due at least in part to integration of numerous functions in a single integrated system. The system may include a central controlling system. Each component may be modular and scalable. To achieve modularity and scalability across numerous use cases, both digital and analog communication modules are included. In some embodiments, the system may be configured to run parallel reactions, effectively doubling the data output.

Power loss is an inevitable potential hazard in an automated reaction control system. For example, in the field of catalyst study, interruptions to gas flow or temperature significantly impact catalyst health and cause data to be lost. More importantly, brown-outs, and unstable power can cause damage to computers and scientific equipment. Damage to equipment such as a GC would cause downtime in the process and be expensive to fix. To reduce this potential for power loss, an uninterruptible power supplies (UPS) may be included. In some embodiments, the system is configured such that the technology infrastructure is not on the backup power supply. In such embodiments, data may be buffered within the system to handle short power interruptions so there is minimal data loss in the event of a power outage less than the run time of the UPS. Data buffer capacity and data resolution are scalable for cost and resolution requirements.

In some embodiments, features and benefits of the system include the following:

Automated control system connectivity

Mass flow controllers providing controlled gas flows

Furnace allowing for temperature controls and alarms

Furnace modifications for multiple reaction tubes

Expandable to multiple furnaces

Gas sensors provide detection of toxic/explosive gasses

On-stream product sampling (e.g. GC)

Pneumatically controlled pilot valves
    a. Reduces spark risk
    b. Normally closed to provide gas shutoff in case of power outage Touchscreen human-machine interface with system diagram displays and/or controls:
    a. Gas sensor alarms
    b. Flow rates for each mass flow controller
    c. GC triggering controls and status
    d. Reactor and plant air pressures
    e. Furnace temperature
    f. Pneumatic valve state and control System design intended for continuous and long-term reactions Minimal human intervention Periodic gas sensor calibration Online data logging to InitialState (https://iot.app.initial-state.com/#/tiles/bkt_46 knfr7kdt3e8mh) including
    a. Gas sensor alarms
    b. Flow rates for each MFC
    c. GC trace and status
    d. Reactor and plant air pressure
    e. Furnace temperature
    f. Pneumatic valve state
    g. System status
    h. Historical data
    i. Downloadable CSV files Gas sensor heads tied into detector junction box Expandable, while providing simplified feedback to control system Safety features Automatic shutoff Text alerts Maximum reactor pressure alerts Maximum reactor pressure change alerts Furnace door open shutoffs Furnace over-temperature shutoffs Toxic gas detection and response Uninterruptible power supplies to handle power outages Buffer for time-stamped data Variable buffer capacity Variable data resolution The automated control system may provide connectivity to each modular component, for example, in a typical heterogeneous reaction. Components include MFCs, furnace, gas sensors, GC instrumentation, and pneumatic valves. FIG. 1 is a schematic diagram of the reaction system showing the reaction gasses in a vented gas cabinet with stainless steel lines into the fume hood and MFCs. The gasses are then flowed through two reactor channels in the furnace with individual pressure gauges, and finally sampled outside of the fume hood by an analysis instrument, in this case a GC instrument. Gasses within the vented gas cabinet can be explosive or toxic, and have pneumatic normally-closed valves to shutoff flow in any dangerous situation. Pneumatic valves are also used as sampling control. MFCs allow for various gasses to be introduced into the reactor tube in various rates and ratios for flexible reaction conditions. Reactor tubes containing the catalyst and then inserted into the furnace provide a reaction vessel, while the GC provides an analysis tool. Each component is controlled via the touchscreen HMI. Controlling each component from a single location allows ease of use and functionality. This system is designed to run continuously with minimal interaction beyond checking on equipment condition and gas sensor calibration. Various data may be uploaded to a cloud based web service (e.g. INITIALSTATE) including furnace temperature, flow rates, reactor pressure, house air pressure, GC data, and pneumatic valve position.

The invention can be further understood by the following non-limiting examples.

Example 1—Catalysis of Greenhouse Gases to Value-Added Products

Greenhouse gas emissions are of vital concern, such that multiple governments of this world have created goals for lowering emissions. Locally, Wyoming has 16 of the nation's largest natural gas fields. These fields include the Jonah and Pinedale fields, with gas reserves estimated over 40 trillion cubic feet. [1] These major gas reserves have pushed Wyoming to the third highest source of natural gas flaring in the US. Natural gas is primarily methane, with varying amounts of ethane, propane, and higher hydrocarbons. Additionally, natural gas often contains sulfur impurities such as $H_2S$ and COS. Currently, it is simpler and more cost effective to flare the gasses in remote locations rather than clean impurities and transport it via trucks or trains. Flaring activity of this magnitude has driven ecological and economical pressure to develop technologies that can mitigate ecological harm. World-wide tightening of emission regulations is also pushing companies to look into cost-effective methods of upgrading these materials to value-added products. Current industrial catalysts are designed for the use of methane in steam reforming ($CH_4+H_2O \leftrightarrow CO+ 3H_2$, $\Delta H=+206$ kJ/mol). [2] Steam reforming technology is involved in the production of hydrogen and synthesis gas. [3] Synthesis gas is a mixture of CO and hydrogen that can be used for feedstock in various reactions including the well-known Fischer-Tropsch synthesis to liquid fuels. [4, 5] Hydrogen production is important for applications ranging from energy generation to ammonia synthesis for fertilizers. [6] Steam reforming provides a $H_2$:CO ratio of about 3, optimal for synthesis of methanol and ammonia, and too high in hydrogen content for the Fischer-Tropsch process. An alternate technology to steam reforming is dry reforming. Dry reforming of methane (DRM) and other hydrocarbons follows the general equation of $C_nH_{2n+2}+nCO_2 \rightarrow (2n) CO+(n+1)H_2$. This class of reactions are highly endothermic (e.g. $\Delta H=+247$ kJ/mol for methane, $\Delta H=+621$ kJ/mol for propane) and require large amounts of heat. [2] However, dry reforming has several advantages over steam reforming including the consumption of the two greenhouse gasses ($CO_2$ and methane), a potentially lower operating cost, and a $H_2$:CO ratio close to 1. [5, 7] Lower $H_2$:CO ratios that approach to 1 are optimal for the Fischer-Tropsch process and higher alcohol synthesis. [8]

The need for the disclosed reaction system is driven at least partially by the worldwide need for a cheap, stable, and coke-resistant catalyst that is active and selective toward dry reforming of methane and mixed hydrocarbons. [7] Further developments of practical catalysts require testing under realistic conditions and timeframes. For these reasons, the selected demonstration reaction is dry reforming of methane with and without higher hydrocarbons. The model catalysts for the demonstration of this system includes Co and Ni particles dispersed over cerium dioxide (ceria, $CeO_2$). [9-12] $CeO_2$ is an important support due to the oxygen storage capacity and ease of reducibility and re-oxidation of this oxide material. [10-15] This system includes more practical conditions than typical laboratory setups and may be scaled to semi-industrial sizes. Introduction of toxic gasses with the inclusion of practical conditions, and the eventual upscaling to semi-industrial necessitated a flexible and scalable system to avoid constant redesign. Increasing requirements and potential for expansion lead to this system, which is modeled for the dry reforming of mixed hydrocarbons with impurity gases such as carbon monoxide and $H_2S$ in mind. However, this can be expanded for any gaseous research such as the Haber-Bosch process for ammonia synthesis. In other embodiments, the system may be employed to control exothermic reactions, requiring automatic over-temperature protection.

In some embodiments, the catalyst may require a simple pre-treatment step. Many oxide-supported metal catalysts require a pre-treatment step of reduction at high temperatures under hydrogen. In some embodiments, the system is configured to automatically perform such pretreatment step involving heat and gas flows. For example, in one embodiment, the system may flow hydrogen through the nitrogen MFC without interfering or reacting with any of the tubing for the DRM reaction. In cases where the pre-treatment step requires harsh or several gasses, a separate furnace, reactor, and MFC setup may be included specifically for pre-treatment.

Reaction System

With the goal of understanding catalyst performance under industrial conditions, a small-scale reactor was constructed that is capable of multiple-reactor tests, independent gas flows and gas mixtures, automatic shutoffs for maximum reactor pressure, user settable alarms for reactor pressure change, toxic gas detection outside of the fume hood, a remote shutoff, and a manual emergency shutoff. These controls together provide a safe environment to work in, while maintaining the unattended reactions. Additionally, the system is configured to automatically flow data from individual MFCs, pressure from both reactors, furnace temperature, and instrumentation for product analysis. Such data may be available online in current and historical data formats, with historical data downloadable as a CSV file.

Figure 2:
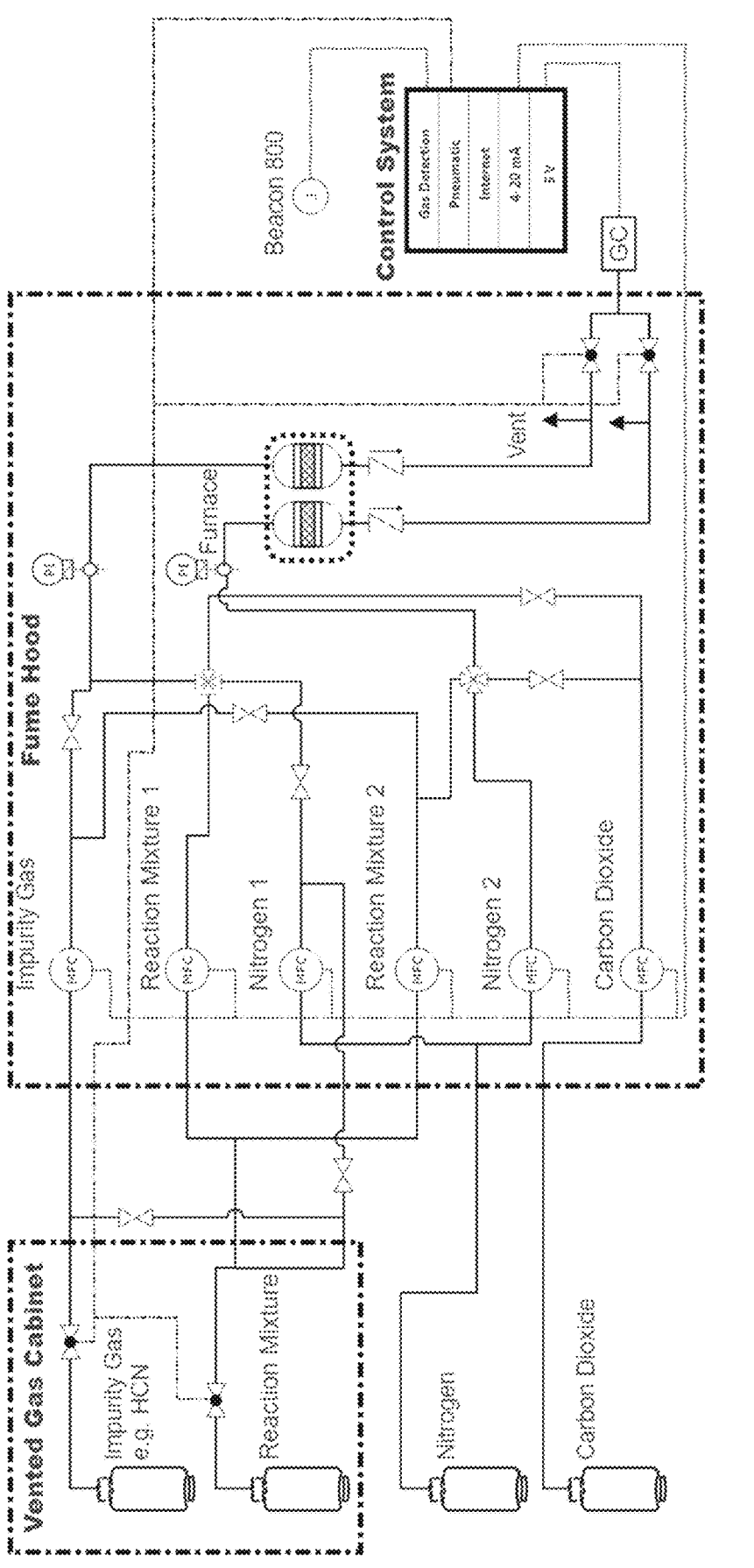
FIG. 2 is a schematic view of the reaction system of FIG. 1 showing the control system. Dashed lines indicate connectivity via pneumatic, 4-20 mA, and digital 0-5 V connections. The RKI Beacon 800 junction box, noted as J, ties each gas sensor into a convenient single digital line.

As shown in FIG. 2, the reaction system may be configured with full control system connectivity, a series of gas lines routed to two reaction channels through a furnace and finally to a vent or sampling system, in this case an online GC. The reaction mixture is contained within a single bottle for consistent gas ratios and may be a mixture of hydrocarbons and $H_2S$, as shown in Table 1. Additionally, a bottle of HCN balanced with nitrogen may be stored in the vented gas cabinet, with nitrogen and $CO_2$ bottles outside of the cabinet. One aspect of the dry reforming of hydrocarbons currently being investigated is the effects of impurity gases (e.g. HCN and $H_2S$) and varied $CO_2$ concentrations in the reaction stream. One study on propane suggested there is an optimal $CO_2$ to propane ratio, implying there is an optimal $CO_2$ to hydrocarbon ratio that will be elucidated for this ratio of methane, ethane, and propane. [16] Nitrogen flow controllers for each reaction channel may be included for use as an inert reference gas and possible dilutant. Separating out HCN and adding an additional $CO_2$ flow controller introduce flexibility to individually add HCN or increase $CO_2$ concentration, allowing for the possibility of comparing the same catalyst under different conditions or different catalysts under the same conditions simultaneously.

TABLE 1

| Composition of gasses calculated from coal pyrolysis study. | |
| --- | --- |
| Gas | Mol percent (%) |
| Methane | 17.96 |
| Ethane | 5.99 |
| Propane | 3.99 |
| Carbon dioxide | 51.90 |
| Carbon monoxide | 18.96 |
| Hydrogen | 1.00 |
| Hydrogen sulfide | 0.10 |

Figure 3:
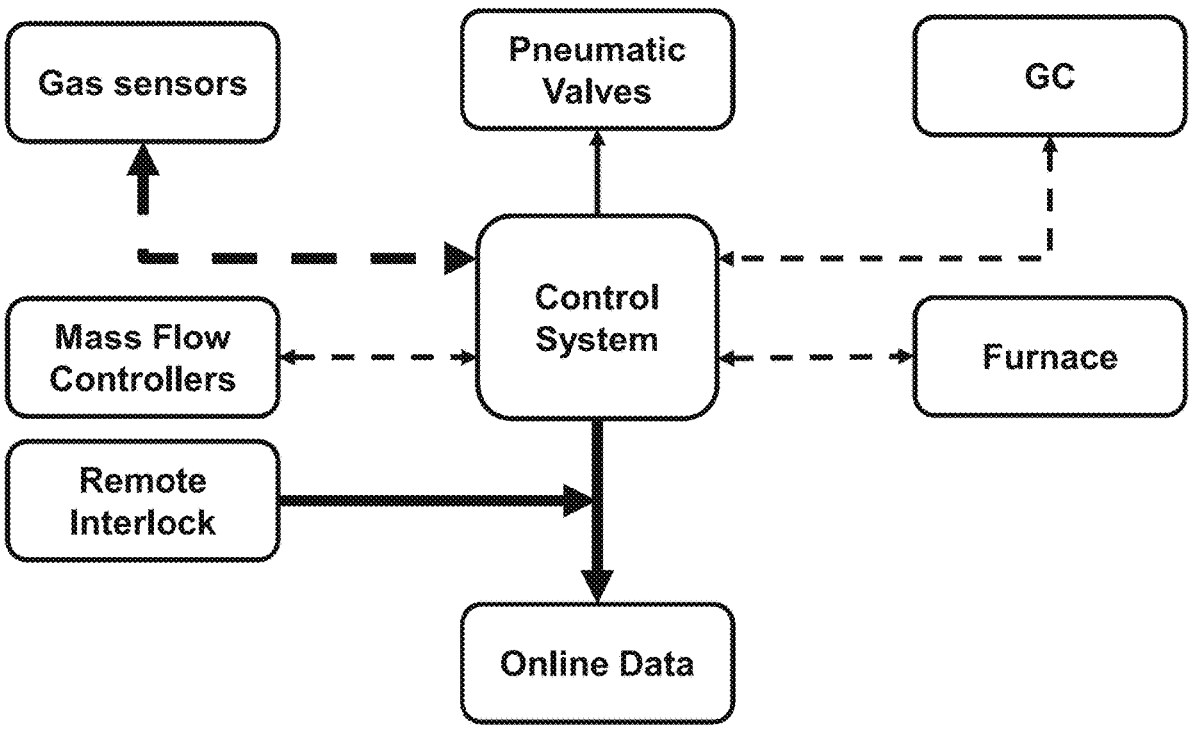
FIG. 3 is a block diagram of one embodiment of the system. Thick solid lines indicate internet connections, the solid line to the pneumatic valves are house air lines to actuate the pneumatic valves, while dashed lines indicate electrical connections. Thick dashed lines are digital and the thinner lines are analog. Analog devices: MFC and GC. Digital devices: RKI Beacon 800 junction box for gas sensors. The furnace has a thermocouple (type N) and an AC input, while the valves are pneumatically piloted.
Figure 4:
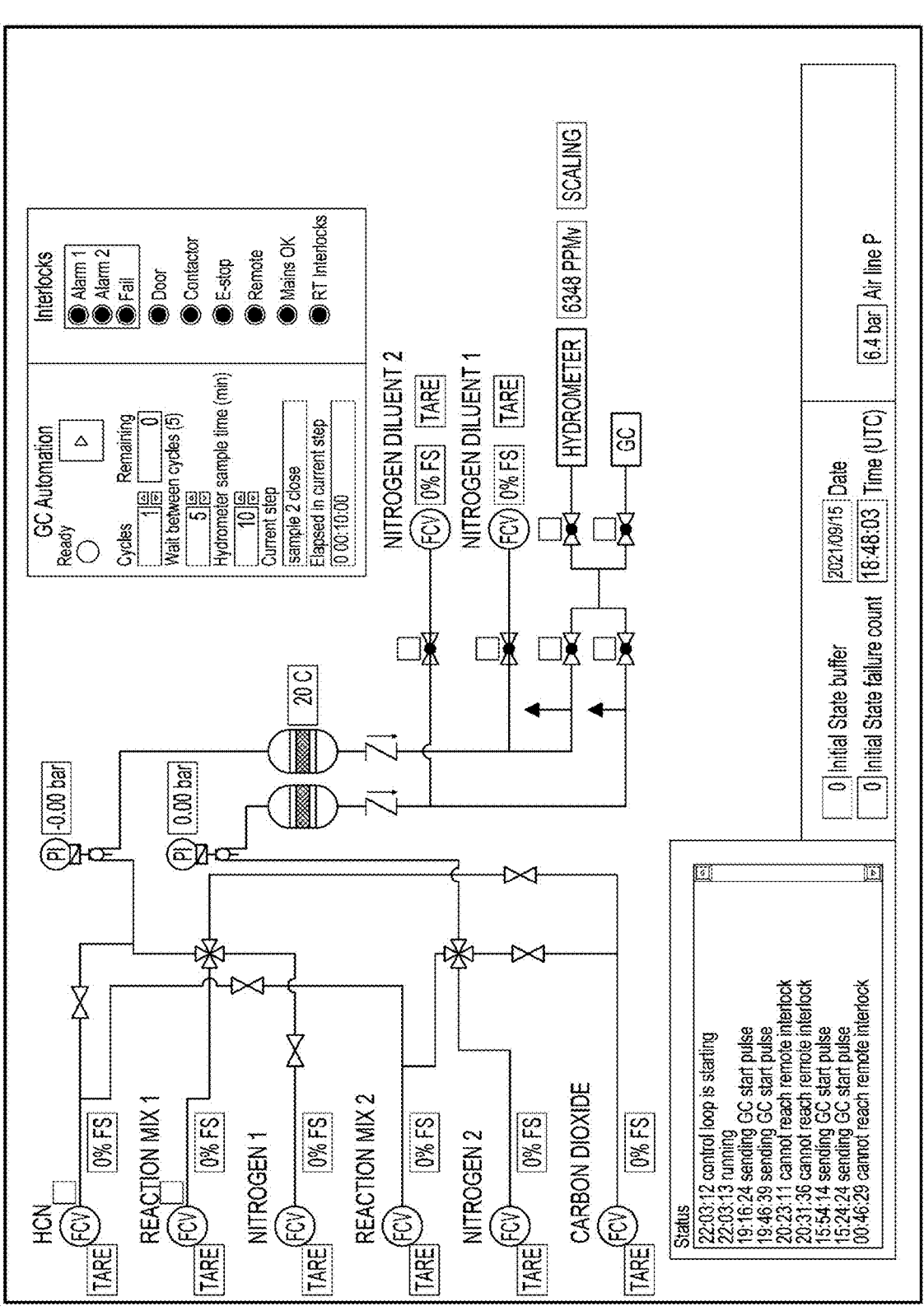
FIG. 4 is an image of one embodiment of a touchscreen human-machine interface (HMI) for interacting with the system. The HMI is shown in an idle state showing a) pneumatic valves in off position, b) MFCs with tare function, c) reactor pressure, d) furnace temperature, furnace door, and contactor interlock, e) GC automation status, f) interlocks including alarms 1 and 2, g) system status, h) date, i) time, j) ambient temperature, and k) line pressure.

The automated control system comprises 6 modular parts as well as an online data monitoring module and a remote interlock module. A block diagram of these systems (FIG. 3) shows: main control system, MFCs, furnace, gas sensors, GC, and pneumatic controls. Various data are uploaded to a web service (INITIALSTATE) including furnace temperature, flow rates, reactor pressure, house air pressure, GC traces, and pneumatic valve position. Inputs to the control system are made via the HMI, which is a touchscreen displaying a system diagram, pneumatic valve state, flow rates for each MFC, GC triggering data, reactor, and plant air pressures as shown in FIG. 4.

Figure 5:
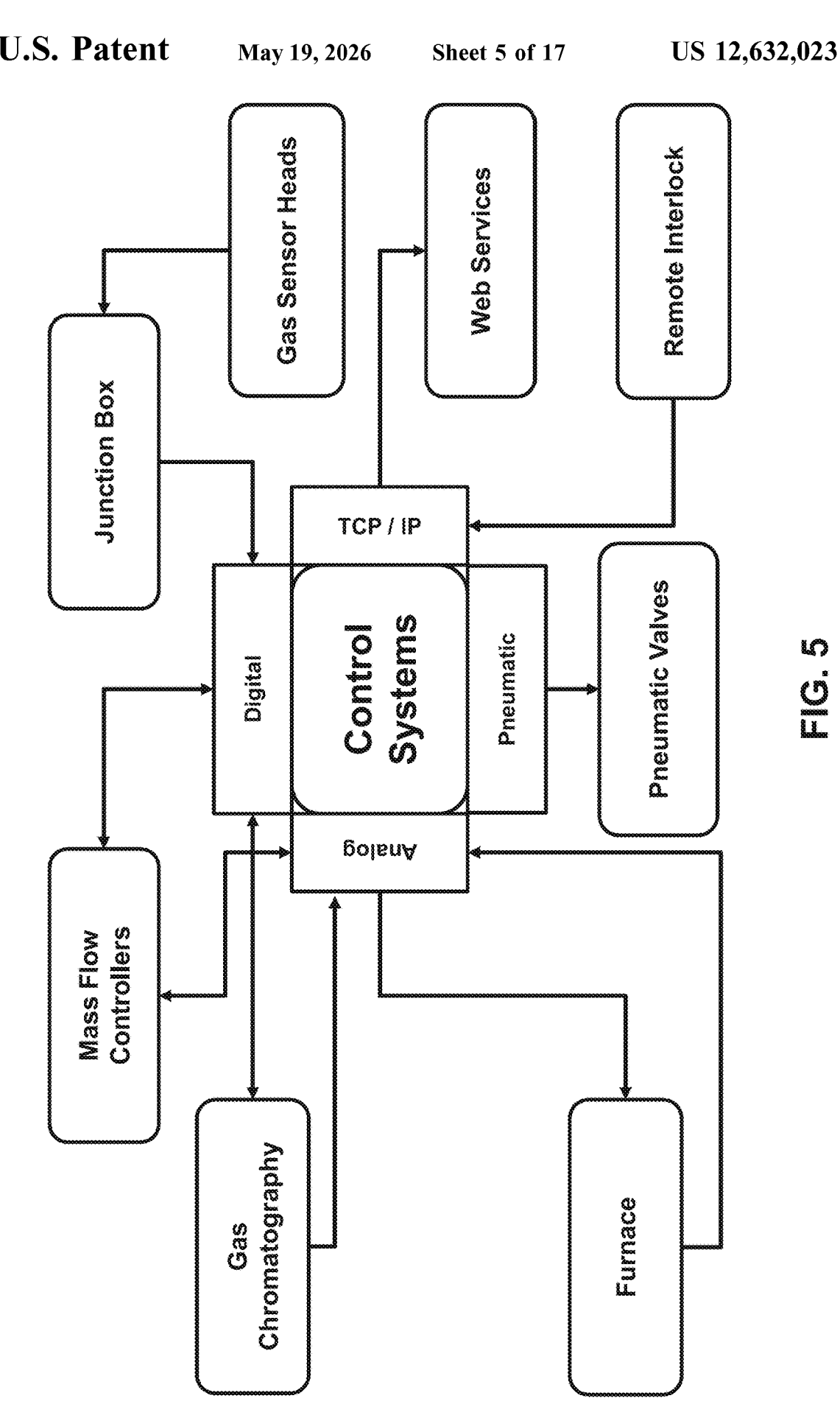
FIG. 5 is a block diagram of a control system in accordance with one embodiment of the system. I/O mapping is shown. Connectivity is achieved with multiple digital, analog, pneumatic, and TCP/IP connections. Arrow direction shows the flow of data or input. Double-headed arrows indicate input and output along the same path.

System control may be achieved with a combination of digital, analog, and pneumatically piloted process valves. In some embodiments, system programing may be configured with LABVIEW 2020, LABVIEW Real-Time, and/or LABVIEW FPGA plugin. The remote interlock may be hosted on AWS S3 while the web dashboard may be hosted on INITIALSTATE. Hardware modules and functions are listed in Table 2 and the block diagram in FIG. 5 shows system connectivity. There are several possible shutdown conditions; normal shutdown, emergency shutdown button is depressed, remote interlock is set to false via a small program, or any safety alarms are triggered. Alarm triggers for possible safety related conditions include failed gas sensors, toxic/explosive gasses detected in tolerable (alarm 1) and dangerous (alarm 2) concentrations. Additional alarms that are not safety related include over-temperature, reactor over-pressure, and settable reactor pressure changes and are included in Table 3. Additionally, non-safety alerts can be moved from INITIALSTATE to the FPGA if they are later identified as a safety concern. Alarm triggers for possible dangerous conditions include failed gas sensors, toxic/explosive gasses detected in tolerable (alarm 1) and dangerous (alarm 2) concentrations, emergency stop button, remote interlock set to shutdown, and large reactor pressure changes and are included in Table 3. Various system responses including a red/amber/green light, audio alarm, MFC shutoff, source gas shutoff and accompanying text/email alerts tailored for each situation. Flow settings, furnace temperature, valve position, number of GC cycles, and pause between are all controlled through a touchscreen panel as shown in FIG. 4, creating an intuitive interface.

TABLE 2

| Hardware modules and functionalities. | | |
| --- | --- | --- |
| Hardware module | Connectivity | Purpose |
| NI cRIO-9035 | | PLC/controller |
| NI-9421 24 V | 24 V digital | Digital input |

TABLE 2-continued

| Hardware modules and functionalities. | | |
|---|---|---|
| Hardware module | Connectivity | Purpose |
| NI-9476 | 24 V digital | Digital output |
| NI-9207 | 10 V analog | Voltage/current Input |
| NI-9211 | Thermocouple | Thermocouple input |
| NI-9401 | 5 V digital | Digital input/output |
| NI-9265 | 4-20 mA analog | Analog output |
| NI-9209 | 10 V analog | Analog input |
| NI-9264 | 10 V analog | Analog output |

TABLE 3

| Events and responses for automation. SMS alerts are customized per alarm condition. | | | | |
|---|---|---|---|---|
| Event | SMS | Amber light | Full stop | Furnace only (off) |
| Alarm 1 | X | X | | |
| Alarm 2 | X | | X | |
| Emergency stop | X | | X | |
| Gas sensor fail | X | | | |
| Maximum reactor pressure | X | | | |
| Settable pressure change | X | | | |
| Furnace door | | | | X |

Figure 6:
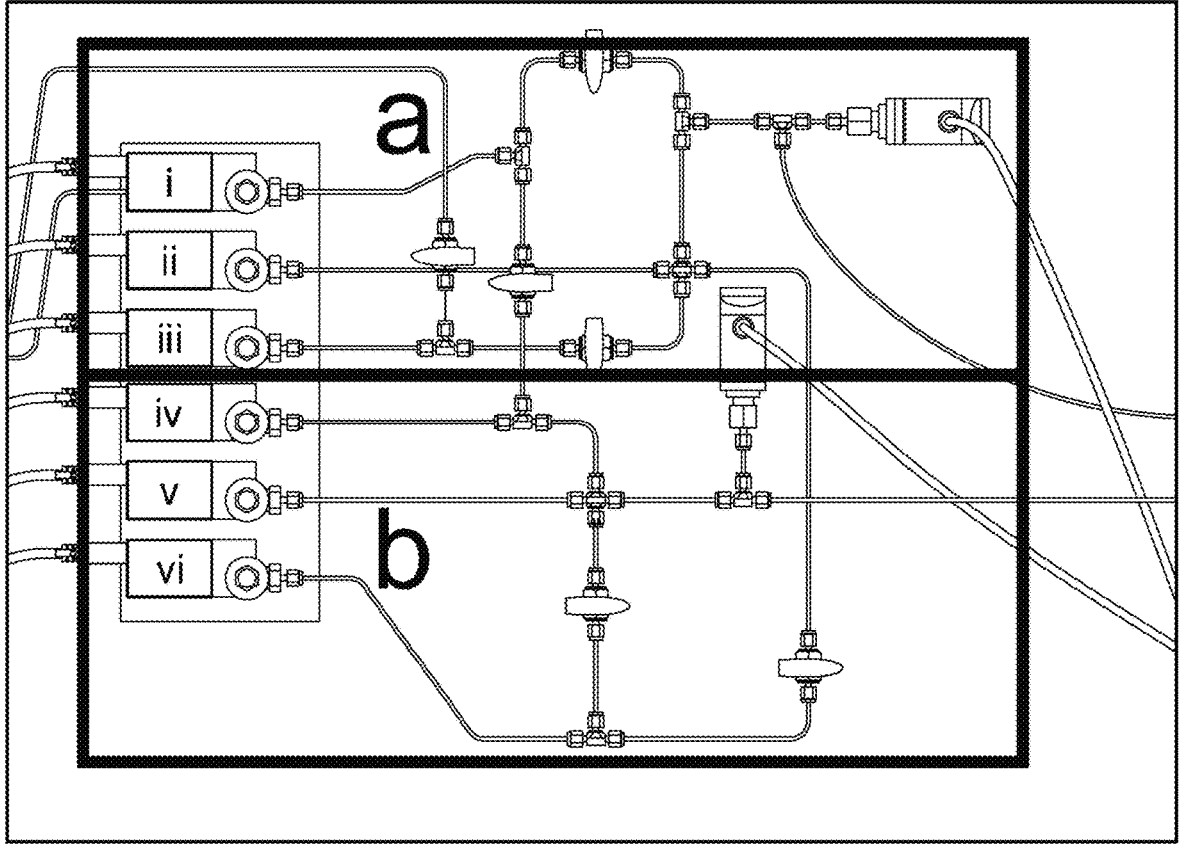
FIG. 6 is a picture of one embodiment of a dual-reactor setup with a) reaction channel 1 and b) reaction channel 2. The MFCs are for i) impurity gasses (e.g. HCN), ii) sample gas reaction mixture, iii) nitrogen, iv) sample gas reaction mixture, v) nitrogen, and vi) $CO_2$. These gases were used for dry reforming reaction of simulated pyrolysis gas steam with impurity gases as indicated in Table 1. The impurity gas and $CO_2$ channels are isolated with Swagelok ball valves from both reaction lines. As pictured, all valves are closed.

The system was configured with MFCs having digital and analog control modes that operate simultaneously. In some embodiments, the MFCs may provide for flow ranges from 10 ml min$^{-1}$ to 100 L min$^{-1}$, allowing this control system to be scalable with no software changes from small flow reactors to semi-industrial sized reactors. In the current configuration, MFC feedbacks are via 0-5 V analog signals. The forced closed condition may be digital and used as a failsafe for situations requiring a full system shutdown. Digital control may be wired through the same RS-485 connections. Digital control allows simplified troubleshooting in addition to possible selection of other gas calibrations. In the illustrated embodiment (FIG. 6), the Aalborg DFC 26 MFCs were constructed with 316 stainless steel and equipped with Viton-A or PTFE/KALREZ where appropriate. A total of 6 MFCs were connected to supply two reaction channels with reaction gasses. Additional MFCs provide two channels of nitrogen and a single channel of both $CO_2$ and HCN. FIG. 6 is an image of the completed reaction line showing the installed MFCs with tubing for two reaction channels. The tubing may be installed as displayed in diagrams from FIGS. 1 and 2. With expanded space, more reaction channels may be added with the appropriate furnace modifications.

In one embodiment, the furnace may be a CARBOLITE VST 1200 with modified endcaps holding two 3 mm quartz plug-flow reactors (modifiable up to 3 tubes) in place. Temperature feedback may be via a type-N thermocouple read directly into a NI-9211 thermocouple 4-20 mA signal to a WATLOW power switching device with variable time-based burst fire AC output. Control may be via the touch-screen HMI, adding simplicity to the control system. Incorporating the furnace controls into the overall control system rather than using a standalone furnace controller may allow for ease of integration for temperature and door open/close safety protocols. While hydrocarbon reforming is a highly endothermic reaction, integration of the furnace thermocouple into the control system may allow the possibility of running exothermic reactions with a similar level of temperature control. Additionally, in some embodiments, the system includes control logic and alerts for over-temperature protection, reducing possible thermal runaway.

Figure 9:
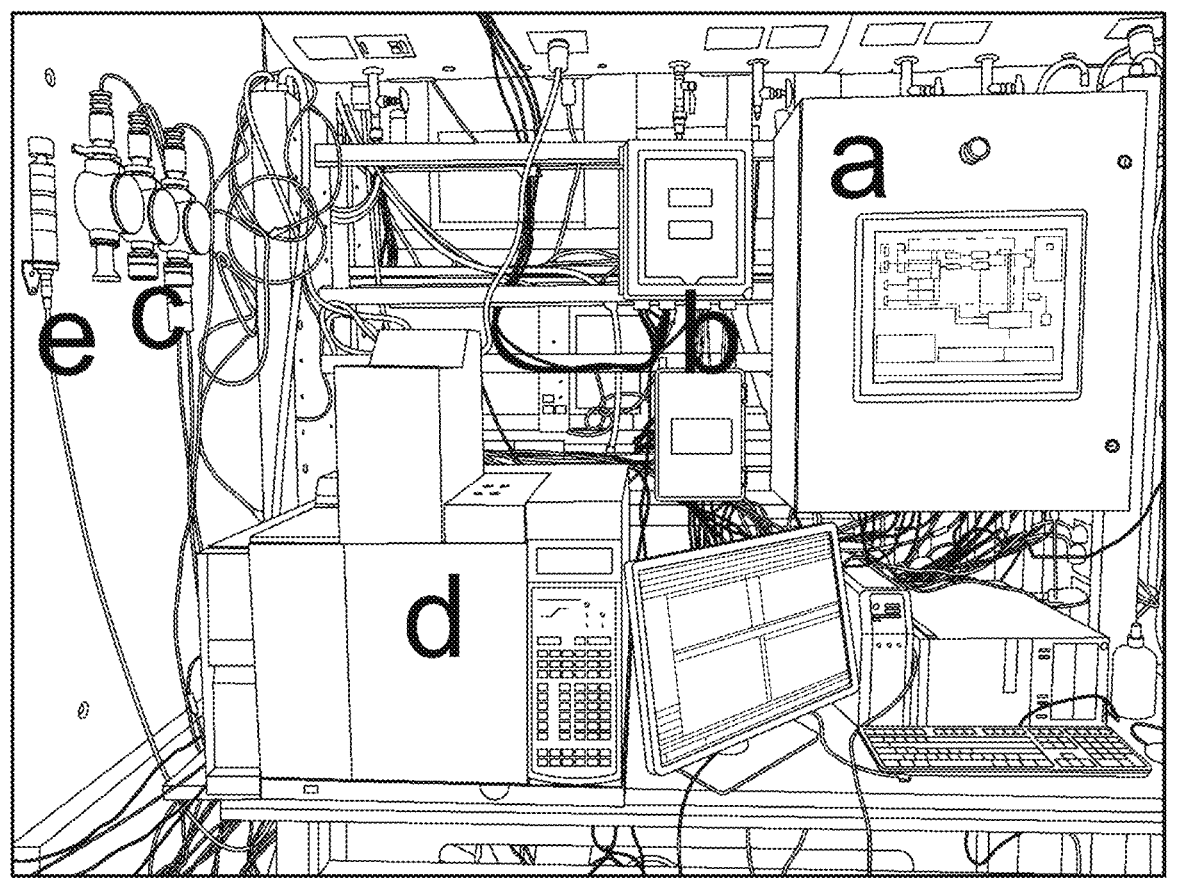
FIG. 9 is a photograph of one embodiment of the system with a) control unit with emergency stop button, b) RKI Beacon 800 junction box, c) primary HCN, LEL, and CO sensor heads, d) Agilent 7890B GC, and e) red/amber/green tower light.

In some embodiments, the gas sensor heads may be RKI Instruments, model S2. In the illustrated system (FIGS. 5 and 9), there are two sets of 4 sensors, a primary and a backup for each gas (e.g. explosive gases, CO, HCN, and $H_2S$). Both sets of sensor heads may be read through an RKI Beacon Eight Channel Wall Mount Controller. The junction box may include two settable alarm levels for each channel with settable latching/non-latching and one failed condition alarm. Condition of failed state, alarm levels 1 and 2 may be individual inputs to the control system to allow distinction between problems with the junction box, toxic/explosive gasses within tolerable levels, and toxic/explosive gas levels at dangerous concentrations. As can be appreciated, for applications with fewer or more sensor heads, smaller channel junction boxes can be used, or additional junction boxes can be added with additional hardware.

Sampling of gasses is performed via a GC. Both reaction channels feed into a single GC as shown in FIGS. 1 and 2. Feeding two reactors into one sampling line requires a longer sample time to purge the sample line and ensure the sampled gasses are from one reactor channel. Pneumatic valves control flow from reaction channels 1 and 2 into the GC sampling tube. When gasses are not being actively sampled, both valves may be closed, flowing the gasses into the fume hood. To initiate a sampling cycle, number of cycles desired and time between them are selected on the HMI. The initial step opens valve 1 for a timed interval that may be determined experimentally, sweeping gasses from the control valve to the GC. After this time, the GC method is automatically initiated and valve 1 is closed. Valve 2 is then opened to flush out the reaction channel 1 gasses. After the GC method has finished, given the ready signal and the sampling time has passed, the GC is automatically initiated again. Once the method has started, the reaction channel 2 valve is closed, and the entered pause duration counts down until the next cycle. Remote control is achieved through Agilent's built-in APG Remote Control system using a 5 V pulse from the programmable logic controller (PLC). The HMI allows users to schedule the PLC to trigger any number of GC runs and intervals between runs, additionally it waits for a 5 V ready signal from the GC. Agilent provides two 0-5 V analog out signals, which are captured by the PLC and displayed on the web interface. In the illustrated embodiment (FIG. 8), data are qualitative but not quantitative to conserve bandwidth and can be used to determine where the GC is in a sampling cycle, rough estimations of catalyst health and off-site diagnosis purposes. In other embodiments, with increased buffer size and bandwidth, the GC trace resolution can be increased.

The modularity of the control system may provide flexibility and ease of adding additional components with minimal re-design efforts. Proof of concept experiments were conducted with dry reforming of hydrocarbons. The line setup was originally designed to monitor the reactants and products in the dry reforming process as indicated in the chemical reaction equation, $nCO_2 + C_nH_{2n+2} \rightarrow 2nCO + (n+1)H_2$. Dry reforming has several side reactions including the reverse water-gas shift reaction ($CO_2 + H_2 \rightarrow CO + H_2O$, $\Delta H_{298}° = +41.2$ kJ mol$^{-1}$). [2, 7] Water content measurement was not originally included in the design. However, owing to the modularity of this system, additional devices may be added ad hoc. There are multiple methods of measuring water, including hydrometers and mass spectrometers. As a demonstration of modularity, a hydrometer was incorporated into the control system, and required small changes to programming and tubing as shown in FIG. 4.

Figure 7:
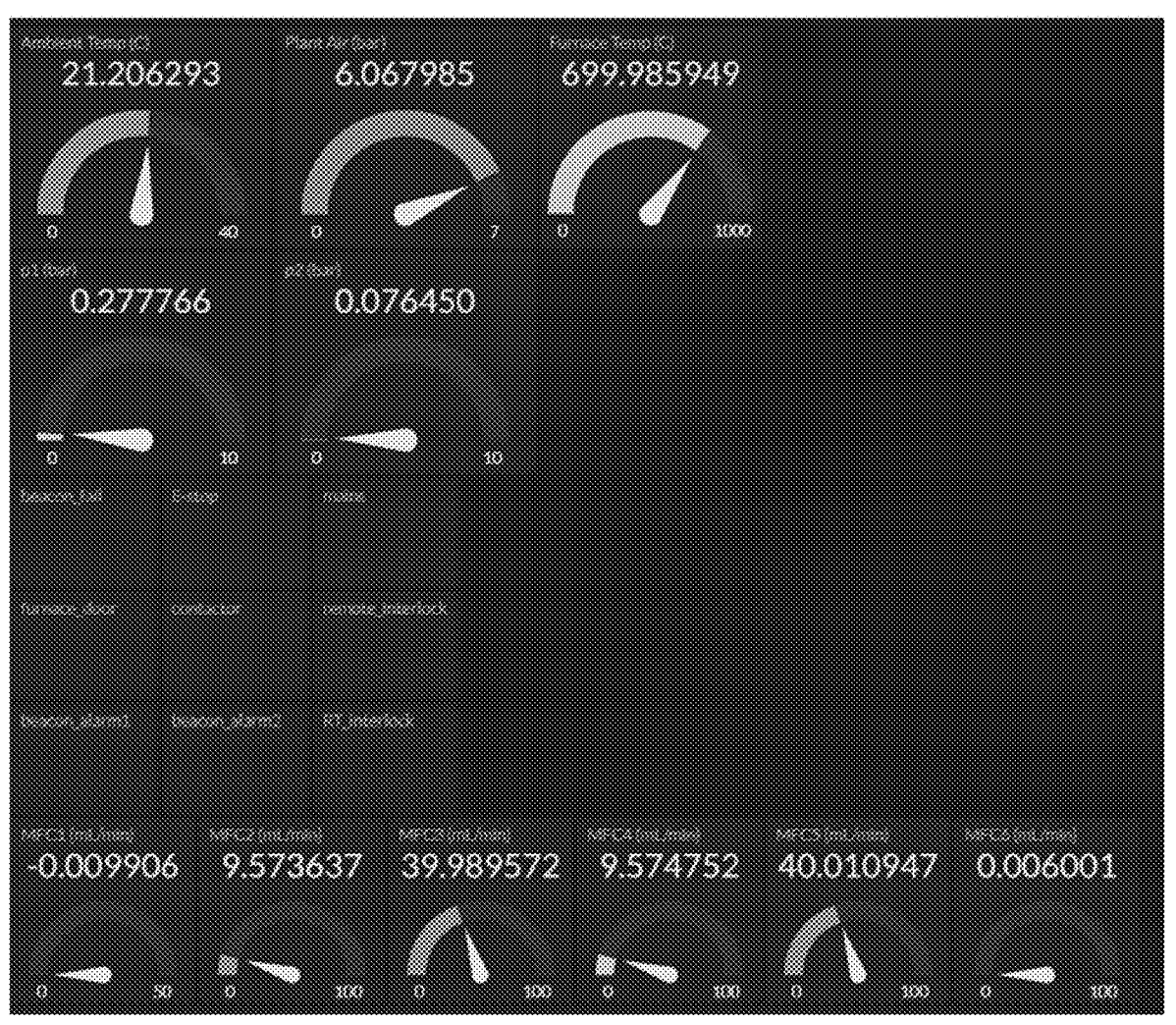
FIG. 7 is a view of one embodiment of an INITIAL-STATE data display configured in accordance with one embodiment of the system. The illustrated display includes ambient temperature, plant air pressure, furnace temperature, pressures of reactors 1 and 2 (indicated as PI shown in FIG. 1), alarm states, and MFC current flow rates.
Figure 8:
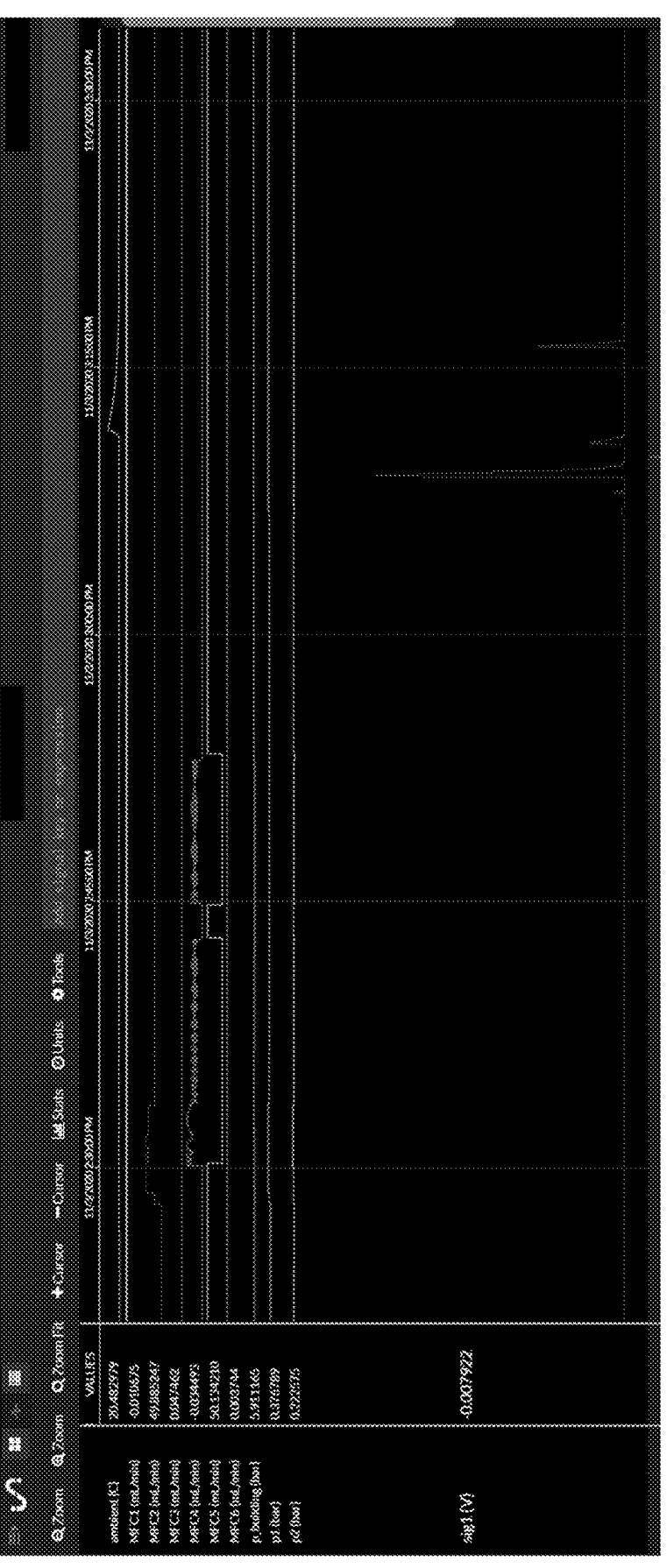
FIG. 8 is a view of an INITIALSTATE data display displaying the furnace temperature, ambient temperature, current flow rates of the six connected MFCs, reactor pressure, and GC trace.

Data may be uploaded to INITIALSTATE for off-site monitoring and some alarm controls. Data include MFC flow rates, furnace temperature, air pressure, pneumatic valve position, emergency stop button condition, remote interlock, ambient temperature, Beacon 800 condition including fail, alarm 1 and alarm 2, furnace door open/close, main power, as well as GC signal. This data may be available for viewing and downloadable as a CSV file. In addition to the CSV file, live data may be displayed in two formats. The first format is current data and is shown as gauges in FIG. 7. The second display format is historical data as shown in FIG. 8. The historical view allows the viewer to enlarge the signal view to make details easier to see, as was done for the GC trace. The illustrated embodiment has lower resolution than required for full data analysis due to buffer size constraints. In other embodiments, the data may be of higher resolution.

The complete system was installed and tested including MFC operation, furnace control, gas sensor installation and calibration, alarm conditions 1 and 2, gas sensor failed state, pneumatic valve control with both manual and automatic modes, and GC automation, which was tested. Data was uploaded to INITIALSTATE. The completed and installed system is pictured in FIG. 9. Main control system, three of the primary gas sensor heads, RKI Beacon 800 junction box and battery backup, Agilent 7890B GC, and tower light are pictured. Not pictured are the furnace, $H_2S$ and secondary gas sensors, and MFCs. One of the advantages of this system is the relatively small horizontal space that consumes since it is mounted on three UNISTRUT bars. Mounting the system in this manner allows for ample space for a workstation and GC instrumentation.

Example 2—Safety Features

The illustrated control system has built-in safety features that are programmed on a FPGA and lower-priority safety features utilizing INITIALSTATE. This allows for microsecond-response time, true hardware parallelism and robustness, bypassing the operating system. FPGA-level alarms include gas sensor alarms and fail state, emergency stop button, opened furnace door, and over-temperature. Lower-priority alarms are pressure changes or maximum pressure in reactor tube and the remote interlock. For these alarms to function properly, a combination of a digital and analog I/O may be used. Digital inputs may include gas sensor alarms 1 and 2, gas sensor failed, emergency stop button, mains power, furnace door and contactor feedback, while reactor and plant pressure may be analog.

Intelligent alarm and control settings may allow the functionality of the system to continue in non-hazardous situations, while reacting decisively and immediately to hazardous situations. Hazardous situations include gas levels above permissible exposure limits, situations where the remote interlock is activated, and any situation where any personnel in the lab presses the emergency button. In the illustrated embodiment, detection of these situations shuts off all pneumatic valves, activates an audible alarm and red light, then finally sends a text message to the operator and safety officer. Detected gasses that are within tolerance activate an amber light, and send out a text message to the operator, without shutting the entire system down. Less serious situations such as a pressure drop in the reactor or the furnace door being open will send a text message to the operator and turn off the furnace, respectively. A table of triggering events and system responses is included in Table 3.

Figure 10:
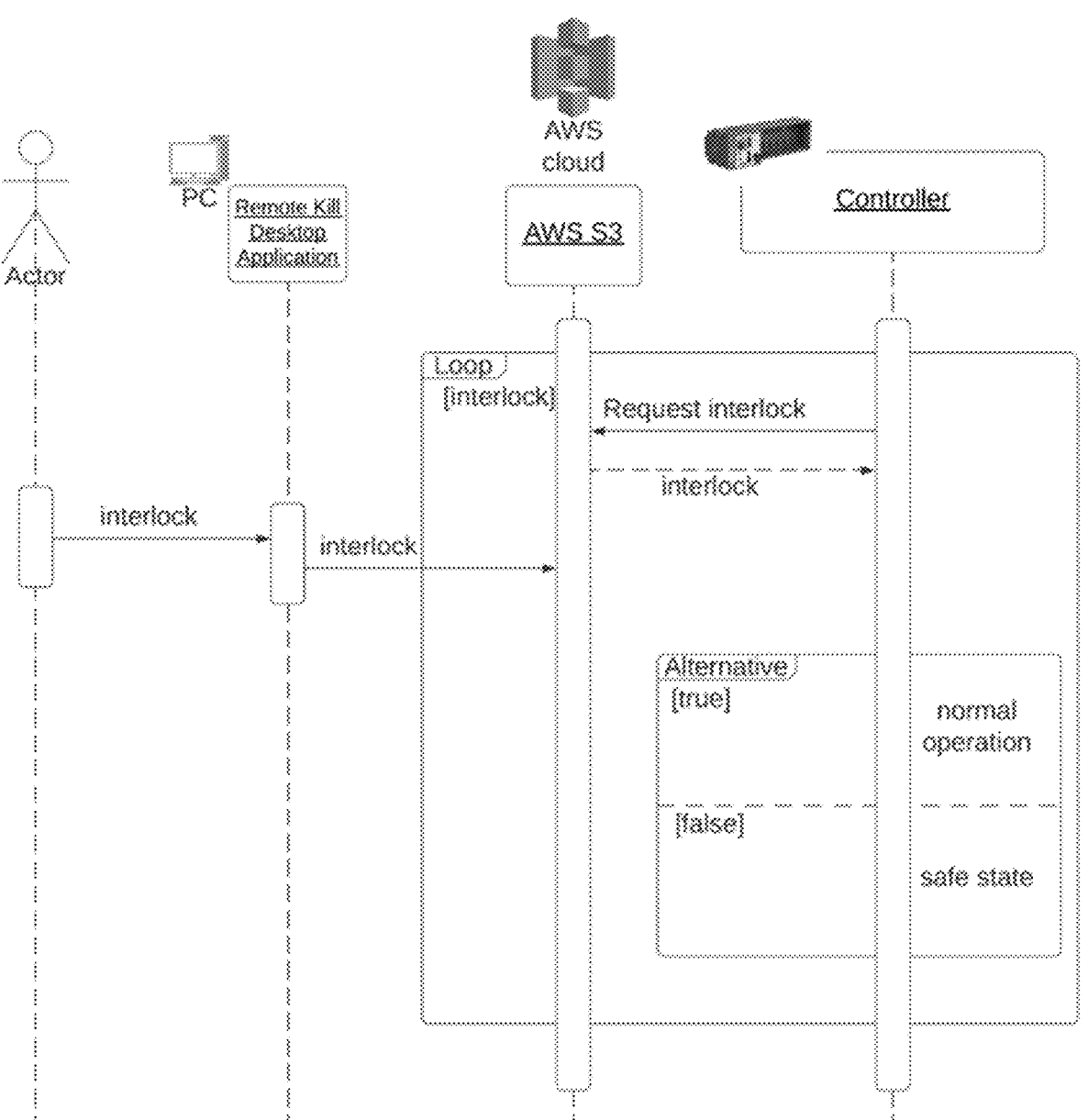
FIG. 10 is a schematic diagram of one embodiment of a remote interlock in accordance with the present disclosure. Solid arrows represent requests and actions from an actor while dotted lines represent the response. The actor and remote kill desktop application is pushing to AWS with no active requests.
Figure 11A:
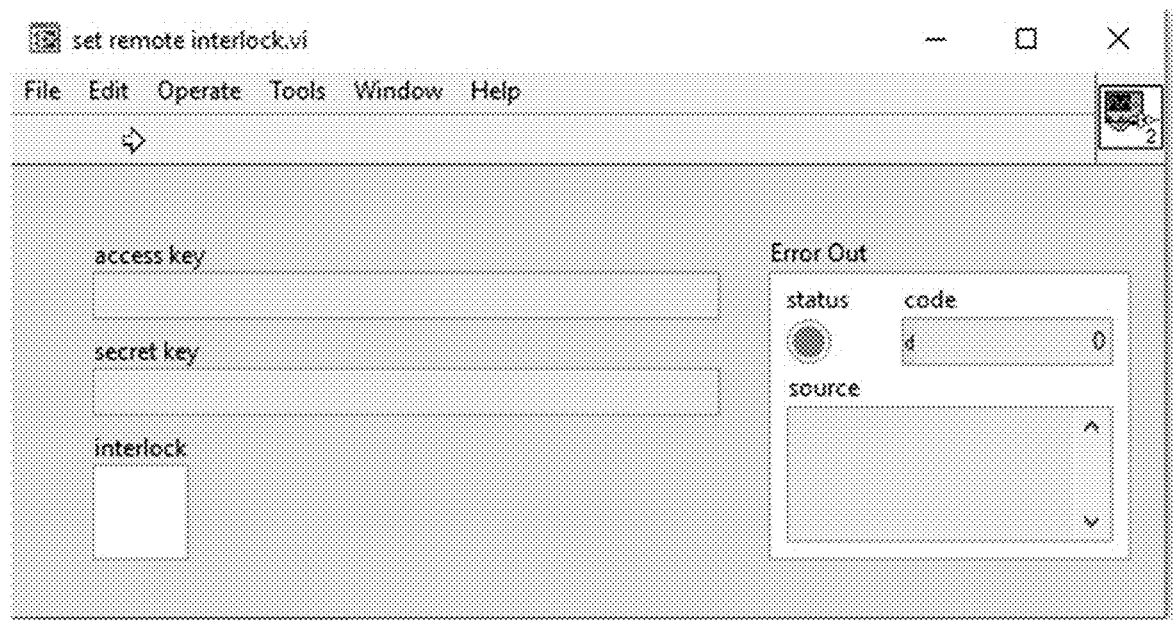
FIG. 11A is a view of an HMI for configuring the remote interlock for normal operation.
Figure 11B:
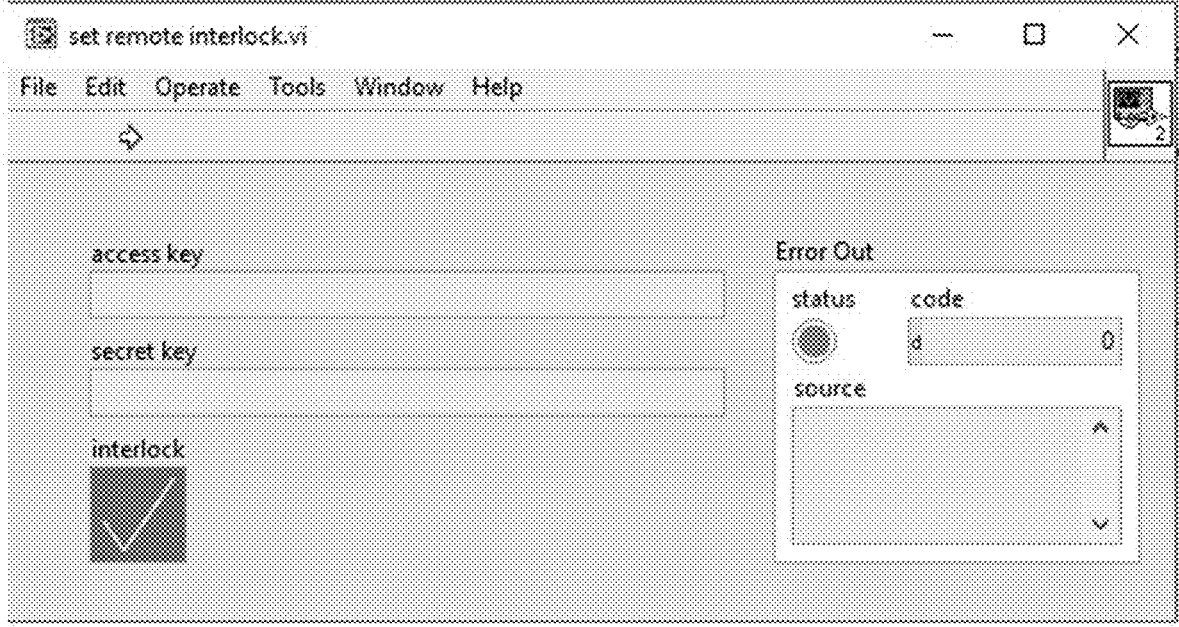
FIG. 11B is a view of the HMI for configuring the remote interlock for remote shutdown.

In the illustrated embodiment, there are three distinct shutdown conditions; emergency button pressed, remote interlock set to false, any number of the automatic shutoff conditions trigger. Specifically, for the remote interlock: there are two programmatic loops that run continuously, including the interlock and a sub-loop called the alternative loop, as shown in FIG. 10. The interlock loop requests the status of the interlock from AWS S3 every 5 seconds and receives a true/false response. Running at the same time as the interlock loop, the alternative loop requests the status of the interlock loop and passes the true/false response. A true response continues normal operation, while a false response engages the safe state. Interaction with the interlock is via a simple desktop application as shown in FIGS. 11A-B. When the interlock checkbox is checked and the code is run, the AWS S3 interlock status is changed from True to False.

In the illustrated embodiment, the controller queries AWS S3 every five seconds to read the remote shutdown interlock value. If the remote shutdown interlock is true, the system continues normal operation. If the remote shutdown interlock is false, the system transitions to the safe state. If a remote shutdown is necessary, the user can set the interlock to shutdown, as shown in FIG. 11B. As a point of clarification, the remote shutdown application can be installed on any computer. A user only needs to install it, check the box, and hit the "play" arrow to run the code. Unchecking the box and running the code again will set the remote interlock back to true, and allow normal operation.

In the illustrated embodiment, the system is set up to only send alerts with high pressure/temperature. In other embodiments, e.g. for an exothermic reaction, the system may include automatic high temperature/pressure indicators to shut down the system.

Alarms are set in INITIALSTATE, and INITIALSTATE handles the backend component of the SMS alerts. INITIALSTATE has a built-in SMS and e-mailing system that allows for a custom message pertaining to each alarm condition such as "toxic gasses detected" or "Beacon 800 fail" in the event of Alarm level 1 or a failed sensor head. SMS alerts and e-mails are sent through INITIALSTATE with each alarm condition being assigned to a phone number and/or e-mail address.

REFERENCES

[1] Wyoming venting and flaring regulations, 2019. [2] CRC handbook of chemistry and physics, 2009.
[3] G. Franchi, M. Capocelli, M. De Falco, V. Piemonte, D. Barba, Hydrogen production via steam reforming: A critical analysis of M R and RMM technologies, Membranes, 10 (2020) 20.
[4] A. C. Vosloo, Fischer-Tropsch: A futuristic view, Fuel Process. Technol., 71 (2001) 149-155.
[5] S. R. Craxford, The Fischer-Tropsch synthesis of hydrocarbons, and some related reactions, Trans. Faraday Soc., 35 (1939) 0946-0957.
[6] S. L. Foster, S. I. P. Bakovic, R. D. Duda, S. Maheshwari, R. D. Milton, S. D. Minteer, M. J. Janik, J. N. Renner, L. F. Greenlee, Catalysts for nitrogen reduction to ammonia, Nat. Catal., 1 (2018) 490-500.
[7] D. Pakhare, J. Spivey, A review of dry ($CO_2$) reforming of methane over noble metal catalysts, Chem. Soc. Rev., 43 (2014) 7813-7837.

[8] K. Wittich, M. Kramer, N. Bottke, S. A. Schunk, Catalytic dry reforming of methane: insights from model systems, Chemcatchem, 12 (2020) 2130-2147.

[9] F. Zhang, Z. Liu, S. Zhang, N. Akter, R. M. Palomino, D. Vovchok, I. Orozco, D. Salazar, J. A. Rodriguez, J. Llorca, J. Lee, D. Kim, W. Xu, A. I. Frenkel, Y. Li, T. Kim, S. D. Senanayake, In situ elucidation of the active state of Co—CeO$_x$ catalysts in the dry reforming of methane: The important role of the reducible oxide support and interactions with cobalt, ACS Catal., 8 (2018) 3550-3560.

[10] Z. Liu, D. C. Grinter, P. G. Lustemberg, N.-P. Thuy-Duong, Y. Zhou, S. Luo, I. Waluyo, E. J. Crumlin, D. J. Stacchiola, J. Zhou, J. Carrasco, H. F. Busnengo, M. Veronica Ganduglia-Pirovano, S. D. Senanayake, J. A. Rodriguez, Dry reforming of methane on a highly-active Ni—CeO$_2$ catalyst: Effects of metal-support interactions on C—H bond breaking, Angew. Chem. Int. Ed., 55 (2016) 7455-7459.

[11] J. Zhou, L. Z. Du, D. L. Braedt, J. T. Miao, S. D. Senanayake, Growth, sintering, and chemical states of Co supported on reducible CeO$_2$(111) thin films: The effects of the metal coverage and the nature of the support, J. Chem. Phys., 154 (2021) 11.

[12] Y. H. Zhou, J. Zhou, Interactions of Ni nanoparticles with reducible CeO$_2$(111) thin films, J. Phys. Chem. C, 116 (2012) 9544-9549.

[13] I. V. Zagaynov, Active components of catalysts of methane conversion to synthesis gas: Brief perspectives, Energy & Fuels, 35 (2021) 9124-9136.

[14] A. Trovarelli, Catalysis by ceria and related materials, Imperial College Press, London, 2002.

[15] D. R. Mullins, The surface chemistry of cerium oxide, Surf. Sci. Rep., 70 (2015) 42-85.

[16] X. D. Wang, N. Wang, J. Zhao, L. A. Wang, Thermodynamic analysis of propane dry and steam reforming for synthesis gas or hydrogen production, Int. J. Hydrog. Energy, 35 (2010) 12800-12807.

Example 3—Demo Results from the Reactor Line and Controller

Basic Experimental Procedure

Figure 12:
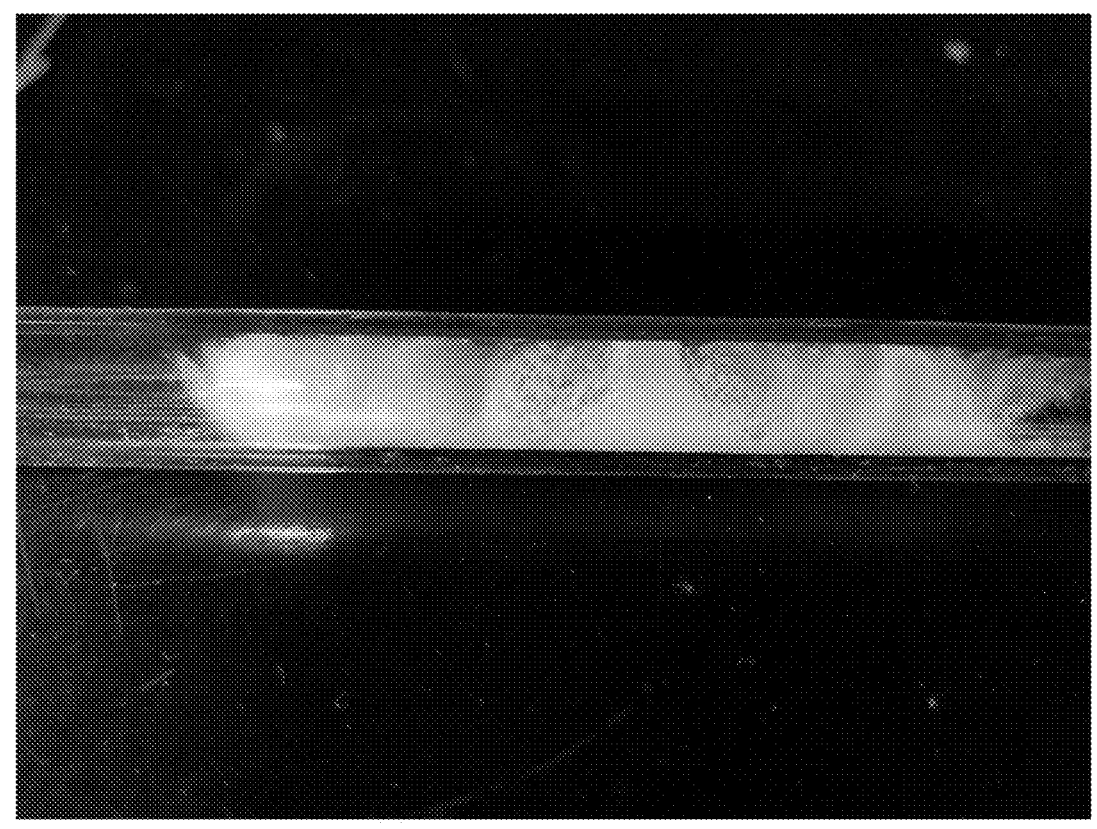
FIG. 12 is an image of a quartz reactor tube with a powder catalyst sample. The catalyst is contained in a quartz wool bed forming a plug flow reactor.

Typical experiments require a 100 mg aliquot of a Ni based catalyst on a cerium oxide support. Multiple experiments were performed to determine an optimal flow rate and catalyst mass. The catalyst is loaded into 7 mm I.D. quartz reactor tubes with a quartz wool bed to form a plug-flow reactor as shown in FIG. 12. The reactor is inserted into the furnace in a down-flow mode. This catalyst requires activation via reduction at 550° C. under 50 ml min$^{-1}$ hydrogen. Flowmeters used are Aalborg DFC 26 configured for the appropriate gasses. Hydrogen flow and furnace temperature are set via the touchscreen control panel as shown in FIG. 4. After an hour of reduction at 550° C., hydrogen flow is replaced with nitrogen flow then the furnace is set to the required reaction temperature. Introducing an inert gas such as nitrogen allows for temperature adjustments while maintaining the current state of the catalyst. Reduction temperatures can be varied dependent on the nature of the catalysts. The furnace is a CARBOLITE VST 12/200 110-120 V clamshell-style tube furnace. It can accommodate reactor tubes with a maximum diameter of 110 mm and has a heated length of 200 mm. With modified endcaps, the furnace can accommodate two 10 mm O.D. reactor tubes. It is capable of reaching 1200° C. within 45 minutes using the original heater control. Temperature is monitored with a type-N thermocouple, while furnace control is achieved with PID control loops with input from the thermocouple, which is read directly into a NI-9211 module in the controller system. The power output is regulated up to 90% of the maximum power due to load limitations of the UPS this furnace draws from, and heating control is achieved with a WATLOW burst fire AC output.

Dry reforming of methane and/or methane with mixed higher hydrocarbons were selected as demonstration chemical reactions for the system. The reaction gas mixture noted in Table 4 was used throughout the experiments for the reforming of mixed hydrocarbons and is a custom blend fulfilled by AIRGAS with a nominal molar composition of 25% methane, 8% ethane, 5% propane, and 62% carbon dioxide with an analytical uncertainty of ±2%. This mixture is a stoichiometric mixture for dry reforming of methane, ethane, and propane and will be referred to as the reaction mixture from now on. The carbon dioxide to hydrocarbon ratio in the reaction mixture cylinder is 1.62:1, which corresponds to a stoichiometric mixture for dry reforming of methane, ethane, propane, and CO$_2$ from Table 4. The reaction gas mixture is introduced to the reactor line via the MFCs labeled in FIGS. 1 and 2 as Reaction Mixture 1 and 2. This reaction is analyzed with gas chromatography due to instrument sensitivity, resolution, and ease of remote operation that are made possible by well documented remote start sequence and dual analog outputs. To begin an experiment, a baseline is collected in triplicate for each flow rate and carbon dioxide to hydrocarbon ratio, to establish the cumulative error with the combination of mass flow controllers and GC instrumentation. Reactant conversion and product yield data can be calculated using this baseline. Equation 1 is the general expression for conversion where X$_i$ is the conversion of reactant species i, n$_{i,in}$ and n$_{i,out}$ are the volumetric flow rate into and out of the reactor. Equation 2 is the general equation for yield, where Y$_p$ is the yield of product species p, n$_{p,in}$ and n$_{p,out}$ are the volumetric flow rate into and out of the reactor for products, m$_i$ and m$_p$ are the stoichiometric ratios of the reactants and products in balanced chemical reactions in the dry reforming process, respectively. Conversion and yield are important metrics to determine the performance of the catalyst. Activity decreases over time as the catalyst slowly degrades, which is reflected in decreasing conversion. The total yield of products and product yield ratio of hydrogen to CO are also important metrics for monitoring the behavior of the catalyst during the dry reforming process. Decreasing yield is expected over time. However, the introduction of a new product or large changes in the ratio of hydrogen to CO can indicate changes to the catalytic system.

$$X_i = 1 - \frac{n_{i,out}}{n_{i,in}} \cdot 100\% \qquad \text{Equation 1}$$

$$Y_p = \frac{n_{p,out} - n_{p,in}}{n_{i,in}} \cdot \left|\frac{m_i}{m_p}\right| \cdot 100\% \qquad \text{Equation 2}$$

Figure 15A:
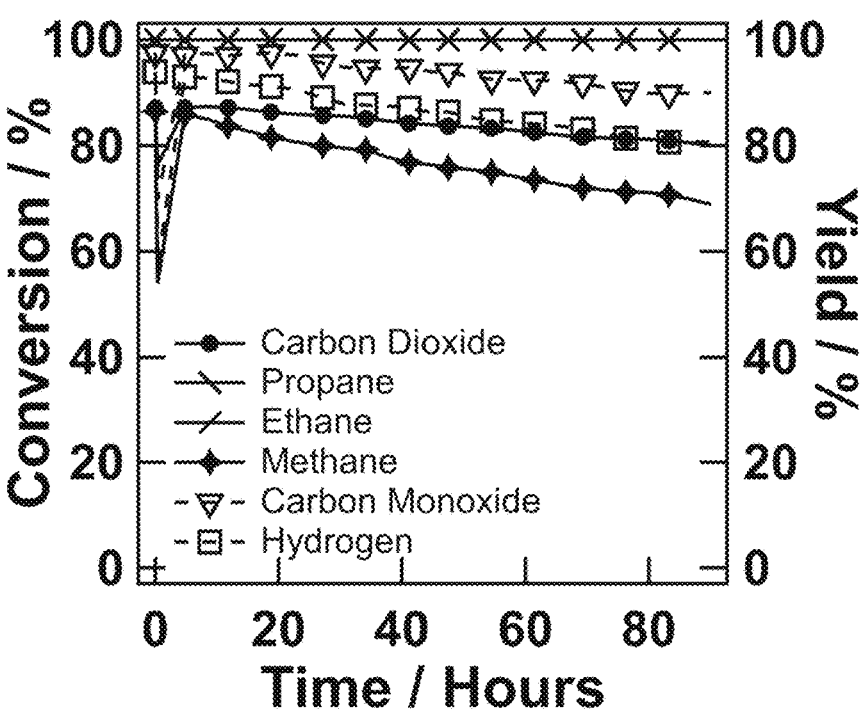
FIG. 15A shows dry reforming of mixed hydrocarbons over a Ni catalyst.
Figure 15B:
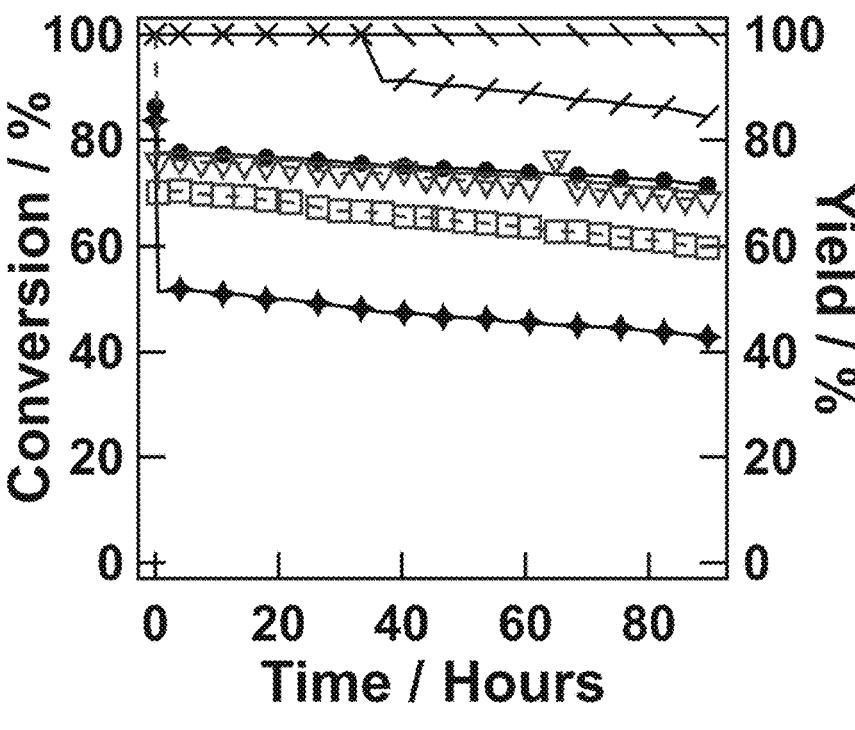
FIG. 15B shows dry reforming of mixed hydrocarbons over a Co catalyst at 700° C. Nominal flow rates of 40 ml min$^{-1}$ nitrogen and 10 ml min$^{-1}$ reaction mixture gas were used. The experiments were performed at the same time using the dual-reactor setup in the same furnace to minimize discrepancies in experimental conditions between two catalysts.
Figure 16:
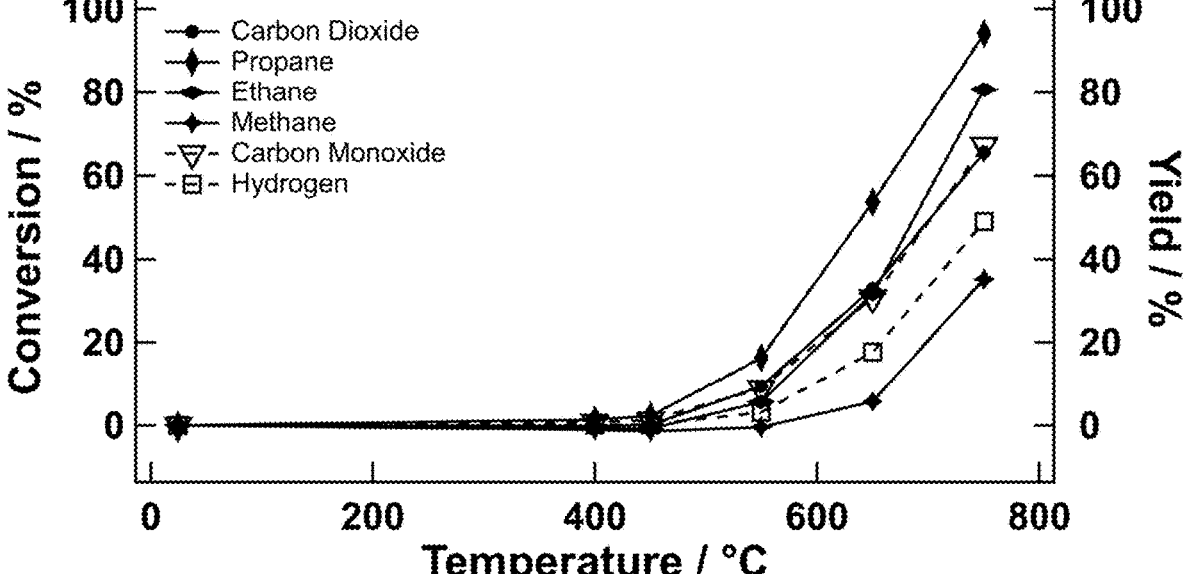
FIG. 16 shows the results of dry reforming of mixed hydrocarbons over a temperature range of 400-750° C. with 50 or 100° C. steps. Reactant conversion and product yield values were analyzed at indicated temperatures, which increase with temperature due to the endothermic nature of the reaction.
Figure 17A:
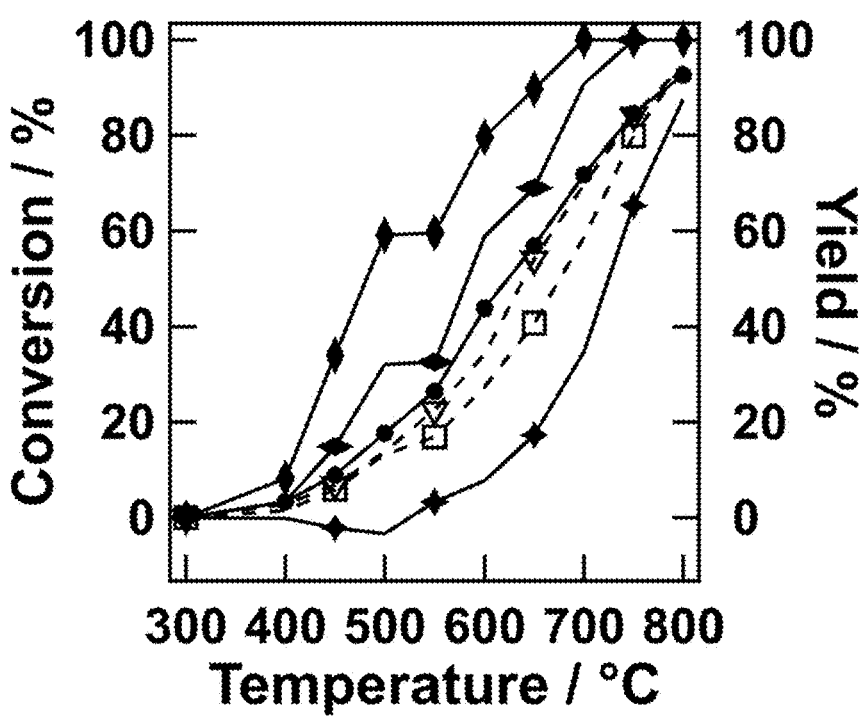
FIG. 17A-B show the results of dry reforming of mixed hydrocarbons (FIG. 17A) and dry reforming of methane (FIG. 17B) over a Ni catalyst with a temperature range between 300 and 800° C. The experiments were performed at the same time using the dual-reactor setup in the same furnace to minimize discrepancies in experimental conditions between these two reactions.
Figure 17B:
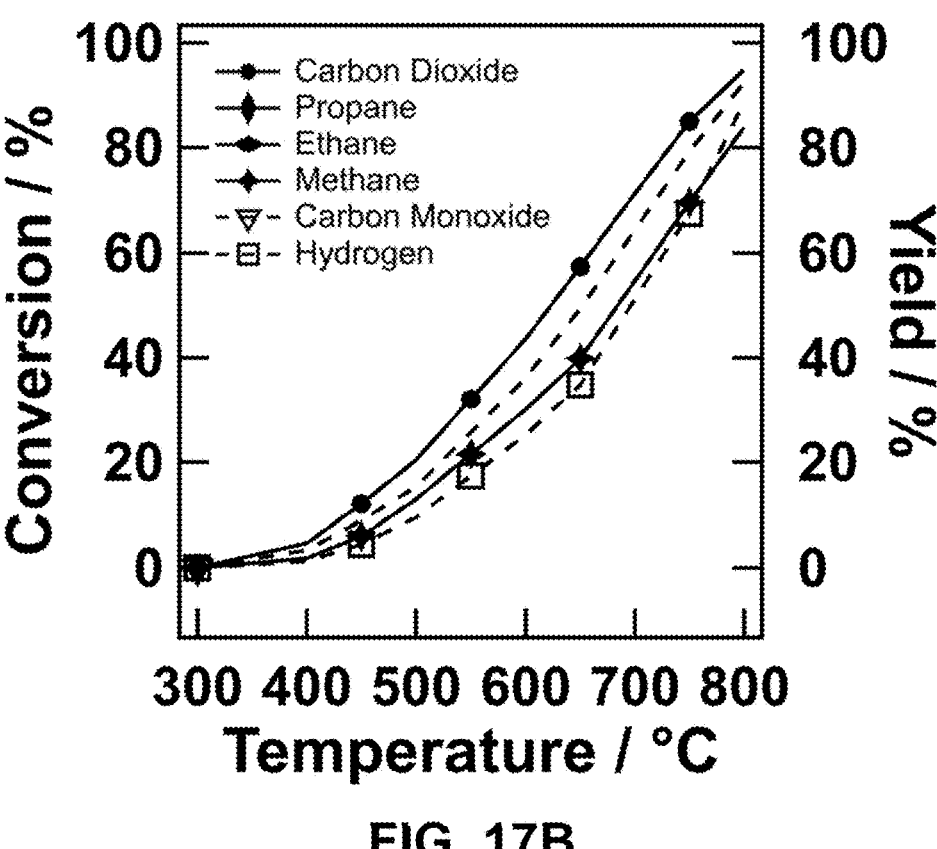

Dry reforming studies at constant temperature can investigate the effect of experimental variables including total flow rate, gas flow ratios and catalyst mass as well as examine catalyst deactivation over time. Five demonstration experiments were selected as proof of concept. Experiments shown in FIGS. 13A-15B were conducted with a steady temperature while incorporating tests of multiple aspects of this control system. Once a temperature and flow rate are selected, the control system is set to maintain the flow rate, furnace temperature, and finally coordinate automated sampling that entails opening/closing pneumatic valves and initiating the GC instrument to collect data. This coordinated operation allows for minimal human intervention while the system is running in an automated mode. FIGS. 16-17B are examples of experiments that investigate reactivity with a constant flow rate over a temperature span and will be discussed in detail below.

Demo Experiment 1

Figure 13A:
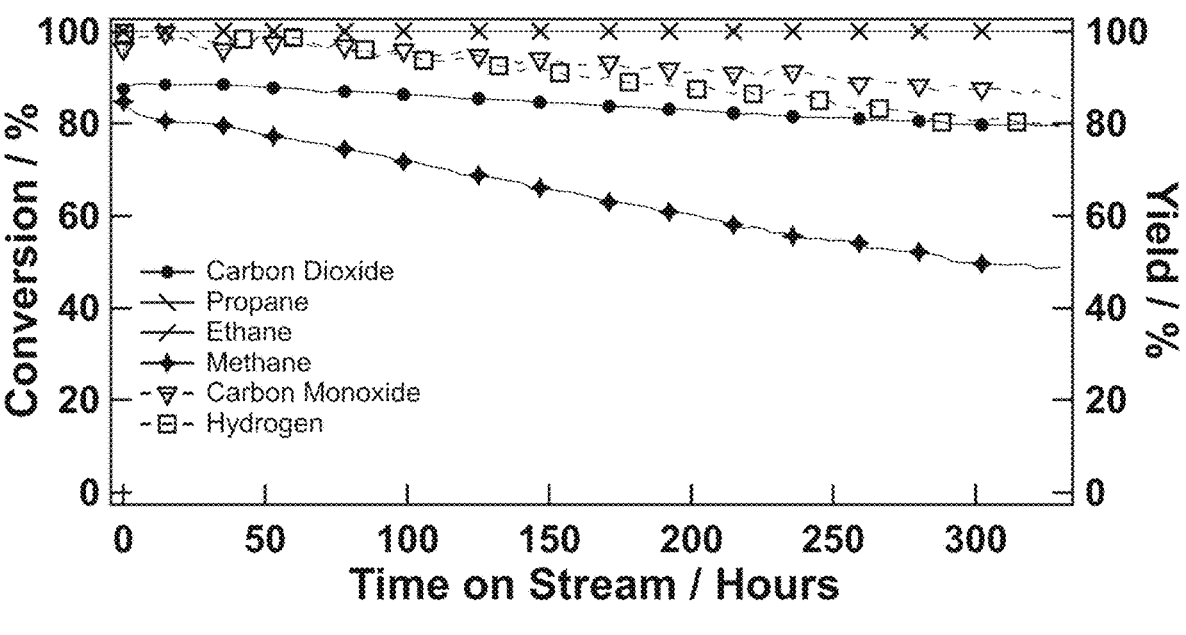
FIG. 13A is a long-term stability test of dry reforming of reaction gas mixture consisting of mixed hydrocarbons balanced with carbon dioxide conducted via one embodiment of the system. Response to changes in heating and gas ratios is shown. Catalytic reaction started at 750° C. over 100 mg of a Ni catalyst with 20 ml min$^{-1}$ of the reaction gas mixture listed in Table 4, and 5 ml min$^{-1}$ of nitrogen as reference gas. The reaction was kept at 750° C. for about 330 hours and reaction product yields and reactant conversions were monitored by an Agilent 7890B GC instrument.
Figure 13B:
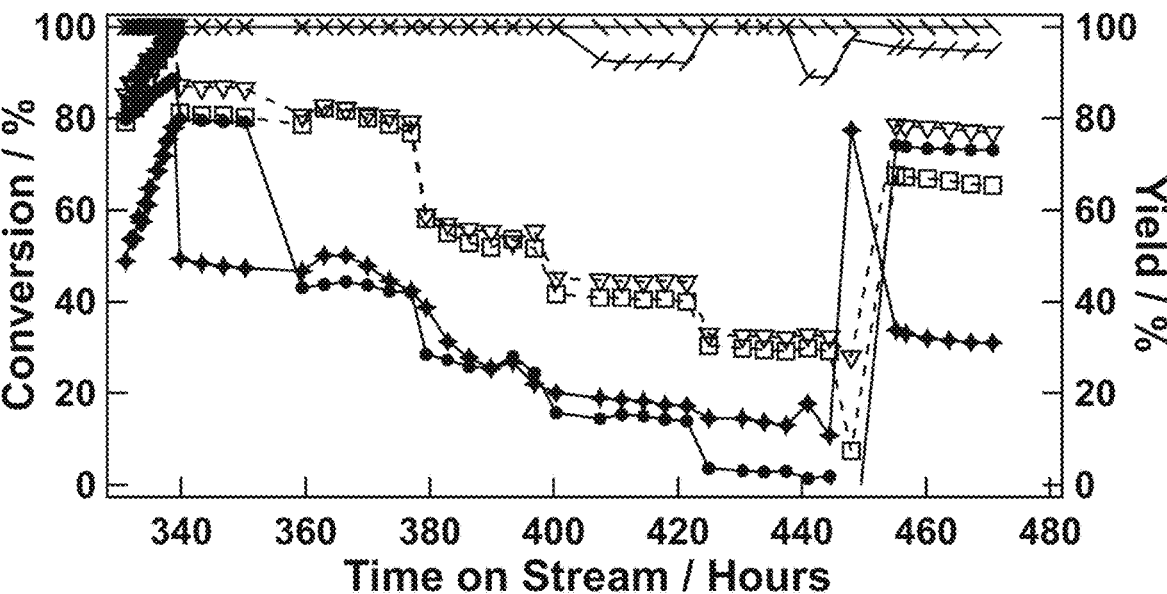
FIG. 13B shows the tests of a temperature ramp and the increase of the $CO_2$ to hydrocarbon ratio conducted after the study shown in FIG. 13A. The reaction was monitored as temperature was increased from 750° C. to 790° C. in 5° C. increments every 2 hours from 331 to 339 hours. Dry reforming reactions are endothermic and increasing temperature increases the product yield and reactant conversion. The temperature was reset to 750° C. at 340 hours and data were collected until 350 hours. From 360 to 445 hours, the $CO_2$ to hydrocarbon ratio was increased from a stoichiometric value determined based on balanced reactions to values of 2:1, 3:1, 4:1, and 6:1. The $CO_2$ to hydrocarbon ratio was varied by decreasing the flow rate of the reaction mixture and flowing additional $CO_2$ through the individual $CO_2$ MFC while keeping the total nominal flow rate constant. At 447 hours, the original stoichiometric flow rate was restored, and conversion and yield were monitored until the end of the experiment at 470 hours.

FIGS. 13A-B are an example of a long-term stability test for dry reforming of mixed hydrocarbons (Table 4) and was conducted over a period of nearly 500 hours. This experiment embodies three major capabilities of the control system: steady temperature and flow rate with GC automation, controlled temperature increases with steady flow rate and manual GC operation, and varied flow rates with steady temperature and periods of GC automation.

100 mg of a Ni catalyst was loaded into both reactor tubes and reduced as described above. Once the reduction procedure of the catalyst was completed and the gas flow was changed to nitrogen for a purge cycle, the furnace was set to 750° C. After a 30-minute period to allow temperature stabilization, nitrogen flow was reduced to 5 ml min$^{-1}$ and 20 ml min$^{-1}$ of the reaction mixture gas was introduced. Phase 1 of this experiment (FIG. 13A) began after 30 minutes on stream. Output gasses were analyzed with the GC twice, then automation was set to run for 24 hours. Automation cycles include sampling reactor 1, analyzing with the GC, sampling reactor 2, analyzing with the GC, and then introducing a pause period to complete one analysis cycle. A typical pause period is 7,200 seconds, giving a 3.5-hour delay between analysis cycles. While the same catalyst and flow rates were used in both reactors for reproducibility, only the data from reactor 1 is shown for simplicity. During this phase of the experiment, the furnace temperature was maintained within 1° C. of the setpoint value for 331 hours. Each day, the automation was set for 20-24 hours after data from the previous day were analyzed. Once the desired catalyst activity was confirmed, another 20-24 hours of automation was initiated.

The second phase of this experiment (FIG. 13B) ran from 330 to 360 hours. Once methane conversion declined to a pre-determined point, the furnace temperature was slowly increased to determine if catalyst activity could be improved. During this phase of the experiment, the temperature was increased to a maximum temperature of 790° C. in increments of 5° C. The furnace reached the setpoint temperature value between 5 and 10 minutes, with a minimal overshoot of ~1° C., demonstrating good temperature control. The furnace setpoint was then reduced back to 750° C. for 10 hours toward the end of the second phase of the reaction.

The third phase of this experiment (FIG. 13B) ran from 360 to 445 hours and was conducted at 750° C. to investigate the effect of varying the carbon dioxide to hydrocarbon flow ratios while maintaining a constant total flow rate. This was achieved by reducing the flow rate of the reaction gas mixture from Table 4, and flowing an appropriate amount of $CO_2$ with the $CO_2$ MFC. A total of 5 ratios were examined; stoichiometric carbon dioxide to mixed hydrocarbons ratio as well as ratio values of 2:1, 3:1, 4:1 and 6:1. Stoichiometric ratios are determined by the stoichiometry of the reactants in balanced chemical reactions in dry reforming process. Additional carbon dioxide was introduced by adding a separate $CO_2$ gas line using the MFC vi as shown in FIG. 6 to prepare reaction gases with higher flow ratios.

The final phase of the experiment (FIG. 13B) ran from 448 to 470 hours and involved examining the catalyst activity returning to initial reaction conditions. After flowing nitrogen for an hour, reaction gasses with initial flow rates were reintroduced, and automation was ran for 15 hours. The control system demonstrated that overall flow can be easily restored.

TABLE 4

| CO₂/Hydrocarbons = 1.63; in a reaction gas mixture cylinder | |
| --- | --- |
| Reaction gas mixture | Mol percent % |
| Methane | 25 |
| Ethane | 8 |
| Propane | 5 |
| Carbon dioxide | 62 |

Demo Experiment 2

An additional pair of experiments was conducted to demonstrate the capability of the reactor system for running parallel reactions. The experiment shown in FIGS. 14A-B examines the same catalyst under two flow rates, while FIGS. 15A-B examine two different catalysts under the same reaction conditions. Running these reactions in the same furnace with analysis using the same GC minimizes experimental uncertainties such as temperature variations and calibration deviations in the GC.

Figure 14A:
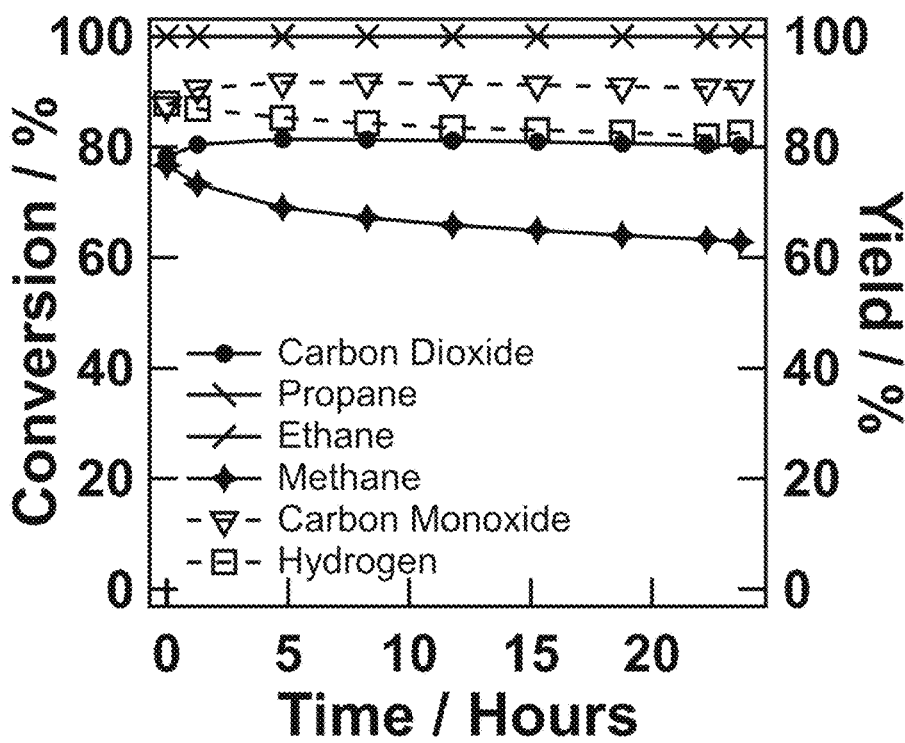
FIGS. 14A-B show the results of dry reforming of mixed hydrocarbons over a Ni catalyst with different nitrogen and reaction gas flow ratios at 700° C. using one embodiment of the system.
Figure 14B:
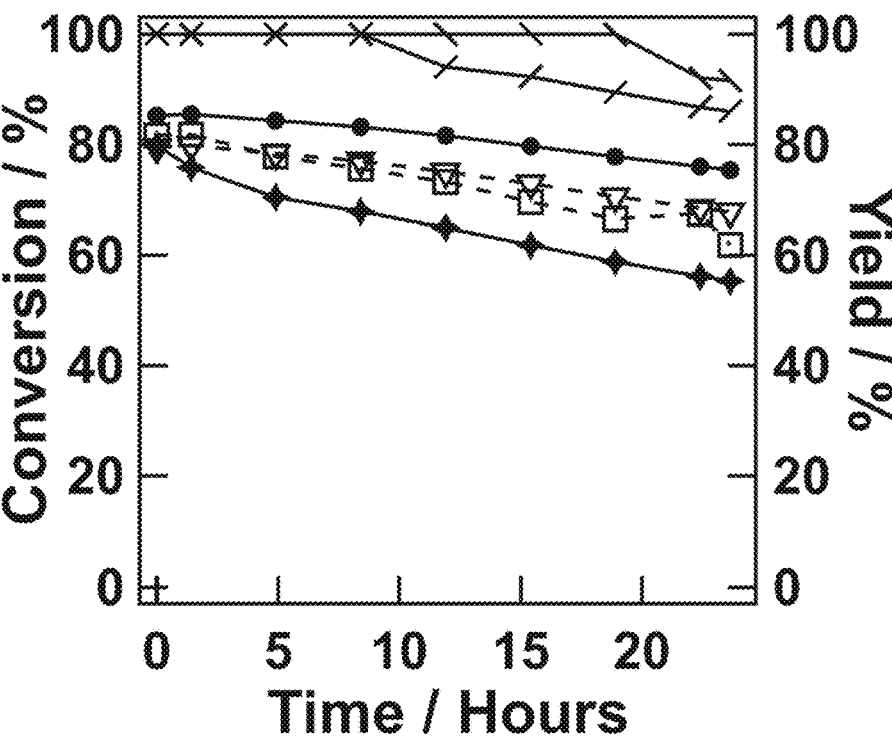

Investigation of a Ni catalyst under different ratios of nitrogen diluent and reaction gasses utilized two quartz tubes in the design. The catalyst was prepared and reduced as previously described. After the flow was set to nitrogen, the furnace was set to 700° C. Similar to the previous experiment, a 30-minute period was observed to allow for temperature stabilization. Then, nitrogen flow to reactor 1 was reduced to 20 ml min$^{-1}$ and the reaction gas was set to 30 ml min$^{-1}$. After 30 minutes on stream, a pair of GC analysis were manually performed. Nitrogen flow to reactor 2 was then set to 30 ml min$^{-1}$ and the reaction gas flow was set to 20 ml min$^{-1}$. After 30 minutes, two GC analysis were performed. The 30-minute sampling time was built into the automation sequence, but was manually observed here, and was required to completely fill the sampling path. Initial values were calculated for conversion and yield for the reaction, and once confirmed the values were reasonable, automation was set for 20 hours. FIG. 14A shows the conversion from reactor 1 with a nitrogen to reaction gas ratio of 20:30, while FIG. 14B is the conversion data from reactor 2. This experiment was conducted over 24 hours, with a total of 6 cycles that were set in automation with a delay of 7,200 seconds, and the final two data points shown in FIGS. 14A-B were conducted manually.

Demo Experiment 3

Simultaneous investigation of two different catalysts under the same flow, temperature, and analysis conditions is important to evaluate which catalyst performs better under given conditions. A Ni and a Co catalyst were selected for this experiment (FIGS. 15A-B). Both reactors were loaded as described above, but the reduction procedure was slightly modified due to required higher reduction temperature of the Co catalyst. Reactor 2 was inserted first, as it contained the Co catalyst. Hydrogen was flown through reactor 2 and the furnace controls were set to 800° C. After an hour of reduction at 800° C., the furnace controls were set to room temperature, with reactor 2 still under hydrogen. Once the furnace had cooled to 50° C., reactor 1, containing the Ni-based catalyst, was inserted into the furnace, and reduced as described previously. The furnace was set to 700° C. after hydrogen flow was replaced with nitrogen for the dry reforming experiment. This dry reforming experiment was conducted at 700° C. for 80 hours. Data were collected in a similar manner to the previous experiments. Reaction gasses were flown into reactor 1 through the reaction mixture 1 MFC, and allowed to flow for 30 minutes, at which point a pair of GC analysis were run, and reaction gasses were flown through reactor 2 through the reaction mixture 2 MFC, and the process repeated. After initial data collection, automation was set up for a total of 80 hours. FIGS. 15A and 15B show the conversion data of reactant gasses over the Ni-based catalyst and the Co-based catalyst, respectively.

Demo Experiment 4

Experiments investigating conversion through a range of temperatures are necessary to elucidate the temperature-conversion curve for a catalyst and can be compared to thermodynamic predictions. This experiment was run in a single-reactor mode, which was carried out initially with the reactor line to examine furnace control and stability, in addition to collecting reactivity data. A 100 mg aliquot of a Ni catalyst was prepared and reduced as previously described. After reduction and replacement of hydrogen flow with nitrogen, the furnace was set to 400° C. due to minimal conversion with the dry reforming reaction. Automation of pneumatic valves and GC were not used during this experiment since the time to reach a temperature setpoint, hold period, sampling and triggering of the GC to run was not known, and is generally unnecessary to incorporate into a system designed to hold a stable temperature. When the setpoint of 400° C. was reached, a flow rate of 40 ml min$^{-1}$ reaction gasses and 10 ml min$^{-1}$ nitrogen was set. For each temperature, a hold period of 30 minutes was observed, then the GC was manually run, and a new temperature was set. Temperature increments of 100° C. were used, except for the initial points of 400 and 450° C. Both 50 and 100° C. temperature increases throughout the range required 15-20 minutes to reach the desired set point with less than an overshoot of 2° C. FIG. 16 shows conversion data for this experiment. The results show the expected trend of increasing conversion with increasing temperature due to the endothermic nature of the reaction.

Demo Experiment 5

The dry reforming experiment was also conducted to examine the behavior of two reactions with 100 mg samples of a Ni catalyst under stoichiometric dry reforming of methane conditions and reforming of mixed hydrocarbons with a stoichiometric carbon dioxide to hydrocarbon ratio. The samples were prepared as detailed above, then brought back to 300° C. under a flow of nitrogen. Similar to the previous experiment, automation of pneumatic valves and GC were not used in this experiment. A total flow rate of 25 ml min$^{-1}$ was used for each of the reactors. For the DRM reaction, a flow rate of 5 ml min$^{-1}$ nitrogen and 10 ml min$^{-1}$ each of carbon dioxide and methane was used. A flow rate of 5 ml min$^{-1}$ nitrogen and 20 ml min$^{-1}$ of the reaction gas mixture shown in Table 4 was introduced to the reactor for reforming of mixed hydrocarbons. Each temperature investigated had a settle time of 30 minutes and a single GC analysis was run for each reactor for the DRM and dry reforming of mixed hydrocarbons. FIGS. 17A-B show reactivity data for this set of the experiment.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of live monitoring of long-term and/or multi-channel reactions, the method comprising:

controlling a chemical reaction apparatus via a modular control system, the modular control system comprising:

a digital control module in electrical communication with digital input and output ports;

an analog control module in electrical communication with analog input and output ports;

a pneumatic control module in pneumatic communication with pneumatic output ports;

collecting reaction data via the digital and analog input ports;

logging the reaction data via a data logging module configured to transmit the reaction data to a remote data server for data storage;

periodically querying, via an emergency stop controller, a remote interlock server for the presence of an emergency stop instruction received from a remote human user, wherein the modular control system is configured such that:

if the emergency stop instruction is not detected on the remote interlock server by the modular control system, then the modular control system continues to control the chemical reaction apparatus as normal; and if the emergency stop instruction is detected on the remote interlock server by the modular control system, then the modular control system executes one or more emergency stop actions;

inputting the emergency stop instruction into a remote user interface via the remote human user, the human user being located remotely from the chemical reaction apparatus;

transmitting the emergency stop instruction from the remote user interface to the remote interlock server;

storing the emergency stop instruction on the remote interlock server;

detecting, via the modular control system, the presence of the emergency stop instruction on the remote interlock server; and executing, in response to the detecting of the emergency stop instruction, the one or more emergency stop actions.

2. The method of claim 1, wherein the one or more emergency stop actions comprise actuating a valve and/or de-energizing a heating element.

3. The method of claim 1, wherein the remote data server is a cloud-based server.

4. The method of claim 1, wherein the remote interlock server is a cloud-based server.

5. The method of claim 1, comprising maintaining power to the modular control system via an uninterruptable power supply.

6. The method of claim 1, comprising automatically responding to one or more predetermined safety events via a field programmable gate array.

7. The method of claim 6, wherein the one or more predetermined safety events comprise at least one of the following:

sensing of a toxic gas, sensing a high pressure alert, and/or sensing a high temperature alert.

8. The method of claim 1 comprising inputting process parameters via a touchscreen panel adapted to display a process flow diagram, wherein the process flow diagram displays real time data and process conditions.

9. The method of claim 1, wherein the data logging module is configured to log data correlated to one or more of the following: gas sensor alarms, flow rates, gas chromatography output, pressure, temperature, and/or valve state.

10. The method of claim 8, wherein the process flow diagram is user-configurable, the method further comprising configuring the process flow diagram.

11. The method of claim 1, wherein the remote data server and the remote interlock servers are different servers.

12. The method of claim 1, wherein the modular control system comprises a remote alarm module, the method further comprising providing notification of an alarm event to the remote human user via the remote alarm module.

13. The method of claim 12, wherein the notification of the alarm event comprises sending an SMS alarm alert to a remote device of the remote human user.

14. The method of claim 12, wherein the notification of the alarm event comprises sending an email alarm alert to a remote device of the remote human user.

15. The method of claim 12, wherein the chemical reaction apparatus is controlled by the remote human user from a location remote of the chemical reaction apparatus.

* * * * *